United States Patent
Toma et al.

(10) Patent No.: US 7,531,582 B2
(45) Date of Patent: *May 12, 2009

(54) RADIATION CURABLE PHASE CHANGE INKS CONTAINING CURABLE EPOXY-POLYAMIDE COMPOSITE GELLANTS

(75) Inventors: Eniko Toma, Mississauga (CA); Peter G. Odell, Mississauga (CA); C. Geoffrey Allen, Waterdown (CA); Jennifer Lynne Belelie, Oakville (CA)

(73) Assignee: Xerox Corporation, Norwalk, CT (US)

( * ) Notice: Subject to any disclaimer, the term of this patent is extended or adjusted under 35 U.S.C. 154(b) by 125 days.

This patent is subject to a terminal disclaimer.

(21) Appl. No.: 11/466,687

(22) Filed: Aug. 23, 2006

(65) Prior Publication Data

US 2008/0122914 A1  May 29, 2008

(51) Int. Cl.
*C09D 11/00* (2006.01)
*G01D 11/00* (2006.01)
(52) U.S. Cl. .................. 523/160; 523/161; 347/100
(58) Field of Classification Search .............. 347/100; 544/143–144; 523/160, 161
See application file for complete search history.

(56) References Cited

U.S. PATENT DOCUMENTS

| | | | |
|---|---|---|---|
| 5,389,958 A | 2/1995 | Bui et al. | |
| 5,476,540 A | 12/1995 | Shields et al. | |
| 5,531,817 A | 7/1996 | Shields et al. | |
| 5,554,212 A | 9/1996 | Bui et al. | |
| 5,804,671 A * | 9/1998 | Dones et al. | 525/423 |
| 5,889,076 A | 3/1999 | Dones et al. | |
| 5,892,116 A | 4/1999 | Weiss et al. | |
| 5,952,446 A * | 9/1999 | Krebaum | 528/90 |
| 5,994,425 A * | 11/1999 | Narang et al. | 522/35 |
| 6,239,189 B1 | 5/2001 | Narayan et al. | |
| 6,316,517 B1 | 11/2001 | Dones et al. | |
| 6,586,492 B1 | 7/2003 | Caiger et al. | |
| 2001/0004871 A1* | 6/2001 | Johnson et al. | 106/499 |
| 2003/0036587 A1 | 2/2003 | Kozak | |
| 2004/0019128 A1* | 1/2004 | Kondo | 522/167 |
| 2004/0186263 A1* | 9/2004 | Pavlin | 528/232 |
| 2007/0120921 A1* | 5/2007 | Carlini et al. | 347/100 |
| 2007/0120924 A1* | 5/2007 | Odell et al. | 347/100 |

FOREIGN PATENT DOCUMENTS

WO   WO 97/24364   7/1997

OTHER PUBLICATIONS

U.S. Appl. No. 11/451,342, filed Jun. 13, 2006 to Odell et al.

(Continued)

*Primary Examiner*—Vasu Jagannathan
*Assistant Examiner*—Doris L Lee
(74) *Attorney, Agent, or Firm*—Oliff & Berridge, PLC

(57) ABSTRACT

Ink vehicles having improved gellant solubility and ink compositions including such ink vehicles are provided. Exemplary ink vehicles include first and second co-monomers, and a gellant that includes that includes a curable epoxy-polyamide composite gellant; in which the first and second co-monomers are radiation curable are different from each other. Additional exemplary ink vehicles include at least two chemically distinct gellants. The chemically distinct gellant materials include a first gellant that includes a curable epoxy-polyamide composite gellant, and a second gellant that includes an amide gellant. Methods for making and using these ink vehicles and ink compositions are also provided.

20 Claims, 2 Drawing Sheets

OTHER PUBLICATIONS

U.S. Appl. No. 11/289,609, filed Nov. 30, 2005 to Odell et al.
U.S. Appl. No. 11/289,521, filed Nov. 30, 2005 to Belelie et al.
U.S. Appl. No. 11/289,615, filed Nov. 30, 2005 to Belelie et al.
U.S. Appl. No. 11/289,552, filed Nov. 30 to Belelie et al.
U.S. Appl. No. 11/289,620, filed Nov. 30, 2005 to Odell et al.
U.S. Appl. No. 11/289,473, filed Nov. 30, 2005 to Carlini et al.
U.S. Appl. No. 11/136,525, filed May 25, 2005 to Belelie et al.
U.S. Appl. No. 11/034,850, filed Jan. 14, 2005 to Odell et al.
U.S. Appl. No. 11/005,991, filed Dec. 7, 2004 to Odell et al.

* cited by examiner

RADIATION CURABLE PHASE CHANGE INKS CONTAINING CURABLE EPOXY-POLYAMIDE COMPOSITE GELLANTS

TECHNICAL FIELD

This disclosure is generally directed to curable inks, such as curable Phase-change inks, and their use in methods for forming images, such as their use in Ink jet printing. More particularly, this disclosure is directed to radiation-curable inks, Such as ultraviolet-light-curable phase-change inks, that comprise an ink vehicle, a cuarble epoxy-polyamide composite gellant and a colorant. The ink vehicle may also contain an additional curable co-monomer, an additional curable gellant, or an initiator for curing upon exposure to radiation.

RELATED APPLICATIONS

Commonly assigned U.S. patent application Ser. No. 11/451,342, filed Jun. 13, 2006, to Odell et al., describes an ink composition comprising an ink vehicle that comprises one or more curable components, wherein the curable components are chosen from molecules including two reactive functional groups and one or more long aliphatic hydrocarbon chains.

Commonly assigned U.S. patent application Ser. No. 11/289,609, filed Nov. 30, 2005, to Odell et al., describes a radiation curable phase change ink comprising an ink vehicle that includes a curable gellant comprised of a curable polyamide-epoxy acrylate component and a polyamide component, and at least one colorant.

Commonly assigned U.S. patent application Ser. No. 11/289,521, filed Nov. 30, 2005, to Belelie et al., describes a composition, comprising: (a) curable monomer; (b) at least one photoinitiator that initiates polymerization of the curable monomer; and (c) phase change agent that provides the composition with an increase in viscosity of at least four orders of magnitude, from a first temperature, the first temperature being from 50° C. to 130° C., to a second temperature, the second temperature being from 0° C. to 70° C., wherein the second temperature is at least 10° C. below the first temperature.

Commonly assigned U.S. patent application Ser. No. 11/289,615, filed Nov. 30, 2005, to Belelie et al., describes a radiation curable ink comprising curable monomer that is liquid at 25° C., curable wax, and colorant.

Commonly assigned U.S. patent application Ser. No. 11/289,552, filed Nov. 30, 2005, to Belelie et al., describes an ink jettable overprint composition, comprising: at least one of a polymerizable monomer and/or a polymerizable oligomer; at least one photoinitiator; and at least one wax.

Commonly assigned U.S. patent application Ser. No. 11/289,620, filed Nov. 30, 2005, to Odell et al., describes a phase change ink having a viscosity of from about 4 mPa·s to about 50 mPa·s at a first temperature and having a viscosity of from $10^4$ mPa·s to about $10^9$ mPa·s at a second temperature, the second temperature being below the first temperature by at least 10° C., but by no more than 50° C.

Commonly assigned U.S. patent application Ser. No. 11/289,473, filed Nov. 30, 2005, to Carlini et al., describes a radiation curable phase change ink comprising an ink vehicle that includes at least one gellant comprising a curable epoxy-polyamide composite gellant and at least one colorant.

Commonly assigned U.S. patent application Ser. No. 11/136,525, filed May 25, 2005, to Belelie et al., describes a wax-tethered photoinitiator comprising a photoinitiator compound including a wax chain therein, wherein the photoinitiator compound is activated by ultraviolet radiation.

Commonly assigned U.S. patent application Ser. No. 11/034,850, filed Jan. 14, 2005, to Odell et al., describes a method of forming an image from a low viscosity ink on a recording medium comprising: ejecting the low viscosity ink from a printer head in the form of droplets onto an intermediate transfer medium to form the image; partially curing the image on the intermediate transfer medium; transferring the partially cured image onto the recording medium; and further curing the partially cured image on the recording medium to create a hardened image, wherein the low viscosity ink comprises a monomer, a photoinitiator and a colorant.

Commonly assigned U.S. patent application Ser. No. 11/005,991, filed Dec. 7, 2004, to Odell et al., describes a printing array assembly comprising: a plurality of printhead ejectors; a plurality of UV-LEDs; and at least one operative orientation; wherein each printhead ejector is located on said assembly in a geometry corresponding to at least one UV-LED such that when said printhead ejector deposits an ink droplet upon a substrate moving relative to said assembly and said assembly is in an operative orientation, at least one of said UV-LED subsequently passes directly over the ink droplet.

The appropriate components and process aspects of each of the foregoing, such as the ink composition components and imaging processes, may be selected for the present disclosure in embodiments thereof. The entire disclosures of the above-mentioned applications are totally incorporated herein by reference.

REFERENCES

U.S. Pat. No. 5,804,671 and U.S. Pat. No. 5,889,076 describe a composition that is useful in the preparation of radiation curable coatings and comprising the reaction product of an epoxy component and an acid component comprised of an ethylenically unsaturated carboxylic acid or reactive derivative thereof, reacted in the presence of, or post-reaction blended with, a polyamide based on a polymerized fatty acid and having a number average molecular weight of less than about 10,000 g/mole.

U.S. Pat. No. 6,239,189 describes a radiation-polymerizable composition that may be included in a printing ink, the composition containing at least one curable acrylate resin oligomer prepared by reacting an alkoxylated polyol with a first acid component which includes an ethylenically unsaturated carboxylic acid, and a rheology modifier prepared by reacting a diepoxide with a second acid component which includes an ethylenically unsaturated carboxylic acid or reactive derivative thereof in the presence of a polyamide based on a polymerized fatty acid. Ink jet inks and/or phase change inks are not described, and in fact it is believed that the viscosities of the inks described in this reference would be so large that such inks could not be jetted.

U.S. Pat. No. 6,316,517 describes radiation-polymerizable compositions that are especially useful as or in a flush vehicle for making flushed pigments. The compositions contain at least one radiation-curable acrylated resin component and a copolymerizable rheology modifier component. In particular, the flushed pigment comprises a pigment and a flushing vehicle, the flushing vehicle comprising a substantially homogenous admixture of two or more curable acrylated resins selected from the group consisting of acrylated epoxies, acrylated urethanes and acrylated polyesters, and a rheology modifying resin copolymerizable with curable acrylate resin when subjected to radiation in the presence of a photoinitiator, for example the reaction product of (i) an epoxy component, (ii) an ethylenically unsaturated carboxylic acid or reactive derivative thereof and (iii) a fatty acid or reactive derivative thereof, said components (i), (ii) and (iii) being reacted in the presence of a polyamide based on a polymerized fatty acid.

U.S. Publication No. 2003/0036587 describes a rheology controlled epoxy composition capable for use in bonding a silicon substrate to a flex circuit or a flex circuit to a pen body, comprising: (a) an epoxy resin component; (b) a rheology control agent selected from the group consisting of epoxysilanes, aminosilanes, trialkoxysilyl isocyanurate derivatives, and combinations thereof; (c) a curing agent component comprising a member selected from the group consisting of amine compounds, amide compounds, imidazole compounds, and combinations thereof, and (d) optionally, an inorganic filler component.

U.S. Pat. No. 6,586,492 describes an ink-jet ink comprising an ink let vehicle and a colorant, the vehicle comprising at least 35% by weight, based on the total vehicle weight, of a radiation curable material and further comprising a thickener, said vehicle being a thixotropic paste at 20° C., and said vehicle having a viscosity of less than 25 centipoise at least at one temperature in the range of from 40° C., to 130° C.

U.S. Pat. No. 5,531,817 discloses a thermal ink-jet ink having the following composition: (a) a color bleed control agent selected from the group consisting of (1) about 0.05 to 2 wt % of a high molecular weight polymer having a molecular weight of at least 10,000 and (2) about 15 to 45 wt (% of an amine oxide surfactant; (b) about 0.5 to about 20 wt % of at least one low vapor pressure solvent; (c) at least one water-soluble dye; and (f) the balance water, wherein the thermal ink-jet ink is a gel at ambient temperatures and is adapted to be heated as necessary to achieve a temperature such that the thermal ink-jet ink has a viscosity within the range of 1.2 to 12 cP immediately prior to jetting the thermal ink-jet ink from an ink-jet pen.

U.S. Pat. No. 5,476,540 discloses a method for printing multi-color images on a print medium in which color bleed between adjacent colored regions is controlled comprising the steps of (a) providing two compositions, a first composition, comprising a gel-forming species and a second composition comprising a gel-initiating species which is capable of reacting with the first composition in order to form a gel therefrom, provided that at least one of the two compositions includes at least one coloring agent; (b) applying the first composition to the print medium in a first region thereon; (c) applying the second composition to the print medium in a second region thereon, the second region being directly adjacent to and in contact with the first region; and (d) allowing the gel-initiating species in the second composition to react with the gel-forming species in the first composition at a position on the print medium where the first region comes in contact with the second region so that the gel is formed at the position in order to prevent color bleed between the first composition in the first region and the second composition in the second region.

U.S. Pat. No. 5,554,212 discloses an aqueous phase change ink composition, comprising: a coloring agent; a water dispersible polyester gloss agent; and an amount of hyperthermogelling component in a concentration such that the ink composition is in a liquid state at a first temperature and is in a solid state at a second temperature where the second temperature is greater than the first temperature.

U.S. Pat. No. 5,892,116 and PCT International Patent Publication No. WO 97/24364 disclose gellants that gel a variety of nonpolar and polar liquids. Moreover, gelation of various monomers with subsequent polymerization of the gelled monomers forms organic zeolites and membrane materials.

U.S. Pat. No. 5,389,958 describes a method of imaging in printer using phase change ink comprising steps of (a) applying a liquid to a first supporting surface to form a liquid layer, the liquid layer serving as an intermediate transfer surface and having an exposed surface not in contact with the supporting surface and an opposing second surface in contact with the supporting surface, (b) imaging the exposed surface of the liquid layer by applying a phase change ink to form an image thereon by changing the ink from a solid state to a molten state and applying it at a temperature of between about 85° C. to about 150° C. in the molten state to the liquid layer where the ink solidifies into a malleable state having a temperature of between about 30° C. to about 80° C.; and (c) transferring the image of the malleable ink to a receiving medium where the ink further solidifies to a ductile state so that it will yield without fracturing and is flexible between about −10° C. and about 80° C.

The disclosures of each of the foregoing patents and publications, as well as any patents and/or publications hereafter mentioned, are hereby incorporated by reference herein in their entireties. The appropriate components and process aspects of the each of the foregoing patents and publications may also be selected for the present compositions and processes in embodiments thereof.

BACKGROUND

Ink-jetting printing systems are known in the art, and thus extensive description of such devices is not required herein. Hot-melt inks typically used with ink-jet printers have a wax-based ink vehicle, e.g., a crystalline wax. Such solid ink-jet inks provide vivid color images. In typical systems, the crystalline-wax inks are jetted onto a transfer member, for example, an aluminum drum, at temperatures of approximately 130-140° C. The wax-based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax-based ink is pressed into the paper.

However, the use of crystalline waxes places limitations on the printing process. First, the printhead must be kept at about 130° C. during the printing process. Moreover, when the printhead is cooled and re-warmed, the resulting contraction and expansion of the ink requires a purge cycle to achieve optimum printhead performance. Furthermore, increased mechanical robustness is desired.

While such known ink compositions are used successfully, a need remains for improved phase-change ink compositions suitable for hot-melt ink-jet printing processes. There is still a need for ink compositions that can be processed at lower temperatures and with lower energy consumption, that have improved robustness, and that have improved jetting reliability and latitude with respect to meeting both the jetting and transfuse requirements of curable ink compositions. In addition, a need remains for phase-change ink compositions that exhibit desirably low viscosity values at jetting temperatures, that generate images with improved look and feel characteristics, that generate images with improved hardness and toughness characteristics, and that are suitable for high-speed printing, thereby enabling transaction and production printing applications. In addition, there remains a need for curable ink compositions for piezoelectric ink-jet printing that produce a stable image that can be transferred to a substrate without cracking and hardened upon cure.

SUMMARY

These and other improvements are accomplished by the radiation-curable phase-change inks described in embodiments herein, and processes of forming images with such inks.

In embodiments, radiation-curable phase-change ink vehicles having improved gellant solubility comprise at least a first co-monomer, at least a second co-monomer different from the first co-monomer, and at least one gellant comprising a curable epoxy-polyamide composite gellant; in which the first co-monomer and the second co-monomer are radiation-curable monomers. Embodiments also include ink compositions including such ink vehicles and methods for making and using ink vehicles and ink compositions.

In embodiments, radiation-curable phase-change ink vehicles having improved gellant solubility comprise at least two chemically distinct gellant materials. The chemically distinct gellant materials include a first gellant comprising a curable epoxy-polyamide composite gellant, and a second gellant chosen from the group consisting of amide gellants. Embodiments also include ink compositions including such ink vehicles and methods for making and using ink vehicles and ink compositions.

BRIEF DESCRIPTION OF THE DRAWINGS

Various exemplary embodiments of the disclosure will be described in detail, with reference to the FIGS. 1 and 2, which each depict rheological properties of a composition within the present disclosure.

EMBODIMENTS

Figure 1:
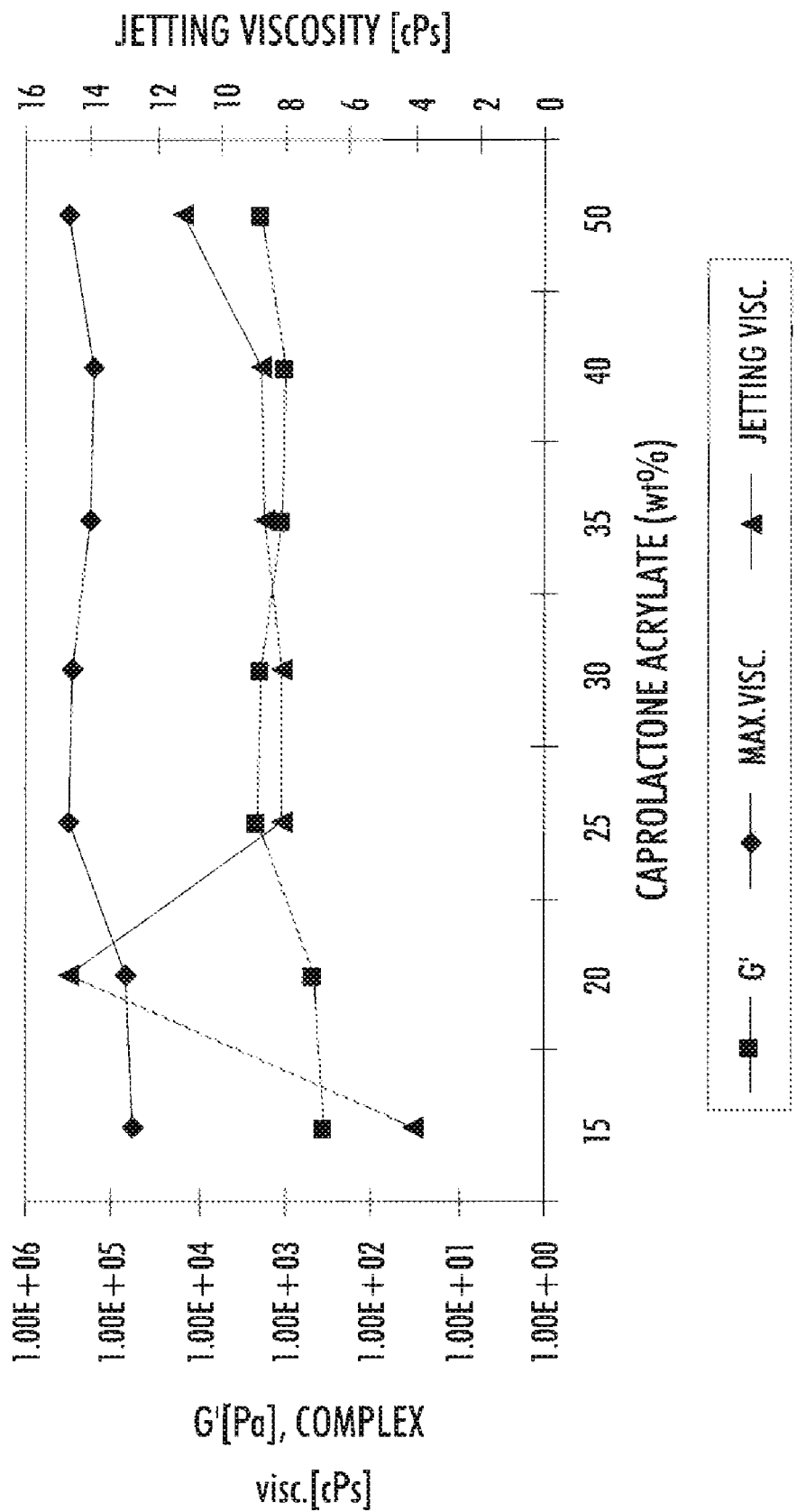

This disclosure is not limited to particular embodiments described herein, and some components and processes may be varied by one of skill, based on this disclosure. The terminology used herein is for the purpose of describing particular embodiments only, and is not intended to be limiting.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The terms "hydrocarbon" and "alkane" refer, for example, to branched and unbranched molecules having the general formula $C_nH_{2n+2}$, in which n is a number of 1 or more, such as of from about 1 to about 60. Exemplary alkanes include methane, ethane, n-propane, isopropane, n-butane, isobutane, tert-butane, octane, decane, tetradecane, hexadecane, eicosane, tetracosane and the like. Alkanes may be substituted by replacing hydrogen atoms with one or more functional groups to form alkane derivative compounds.

The term "functional group" refers, for example, to a group of atoms arranged in a way that determines the chemical properties of the group and the molecule to which it is attached. Examples of functional groups include halogen atoms, hydroxyl groups, carboxylic acid groups and the like.

The term "long-chain" refers, for example, to hydrocarbon chains in which n is a number of from about 8 to about 60, such as from about 20 to about 45 or from about 30 to about 40. The term "short-chain" refers, for example, to hydrocarbon chains in which n is a number of from about 1 to about 7, such as from about to about 5 or from about 3 to about 4.

The term "curable" describes, for example, a material that may be cured via polymerization, including for example free radical routes, and/or in which polymerization is photoinitiated though use of a radiation-sensitive photoinitiator. The term "radiation-curable" refers, for example, to all forms of curing upon exposure to a radiation source, including light and heat sources and including in the presence or absence of initiators. Exemplary radiation-curing routes include, but are not limited to, curing using ultraviolet (UV) light, for example having a wavelength of 200-400 nm or more rarely visible light, optionally in the presence of photoinitiators and/or sensitizers, curing using electron-beam radiation, optionally in the absence of photoinitiators, curing using thermal curing, in the presence or absence of high-temperature thermal initiators (and which may be largely inactive at the jetting temperature), and appropriate combinations thereof.

As used herein, the term "viscosity" refers to a complex viscosity, which is the typical measurement provided by a mechanical rheometer that is capable of subjecting a sample to a steady shear strain or a small amplitude sinusoidal deformation. In this type of instruments, the shear strain is applied by the operator to the motor and the sample deformation (torque) is measured by the transducer. Examples of such instruments are the Rheometrics Fluid Rheometer RFS3 or the ARES mechanical spectrometer, both made by Rheometrics, a division of TA Instruments. Alternatively a controlled-stress instrument, where the shear stress is applied and the resultant strain is measured, may be used. Examples of such instruments are the majority of the current rheometers, the main manufacturers being Anton Parr GmbH, Bohlin Instruments, a division of Malvern Instruments, ATS Rheosystems and TA Instruments. Such a rheometer provides a periodic measurement of viscosity at various plate rotation frequencies, $\omega$, rather than the transient measurement of, for instance, a capillary viscometer. The reciprocating plate rheometer is able to measure both the in phase and out of phase fluid response to stress or displacement. The complex viscosity, $\eta^*$, is defined as $\eta^*\eta'-i\eta''$; where $\eta'=G''/\omega$, $\eta''=G'/\omega$ and i is $\sqrt{-1}$. Alternatively a viscometer that can measure only the transient measurement of, for instance, a capillary or shear viscosity, such as those made by Brookfield Engineering Laboratories or Cannon Instrument Company can also be used.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than, one of the subsequently described circumstances occurs. Similarly, the terms "two or more" and "at least two" refer, for example to instances in which two of the subsequently described circumstances occurs, and to instances in which more than two of the subsequently described circumstances occurs.

Exemplary ink vehicles and ink compositions provide superior print quality while meeting requirements of piezoelectric ink-jet printing processes. In particular, exemplary ink compositions comprise an ink vehicle that comprises a first and a second co-monomer and one or more curable organic gellants. Additional exemplary ink compositions comprise an ink vehicle that comprises two or more chemically distinct curable gellants. Exemplary methods of preparing such ink compositions and exemplary methods of using such ink compositions are also described.

The organic gellants function in embodiments to dramatically increase the viscosity of the ink vehicle and ink composition within a desired temperature range. In particular, the gellant forms a semi-solid gel in the ink vehicle at temperatures below the specific temperature at which the ink composition is jetted. The semi-solid gel phase is a physical gel that exists as a dynamic equilibrium comprised of one or more solid gellant molecules and a liquid solvent. The semi-solid gel phase is a dynamic networked assembly of molecular components held together by non-covalent bonding interactions such as hydrogen bonding, Van der Waals interactions, aromatic non-bonding interactions, ionic or coordination bonding, London dispersion forces, and the like, which upon stimulation by physical forces such as temperature or mechanical agitation or chemical forces such as pH or ionic strength, can reversibly transition from liquid to semi-solid state at the macroscopic level. The ink compositions exhibit a thermally reversible transition between the semi-solid gel state and the liquid state when the temperature is varied above or below the gel-phase transition. This reversible cycle of transitioning between semi-solid gel phase and liquid phase can be repeated many times in the ink formulation. Mixtures of one or more gellants may be used to effect the phase-change transition.

The phase-change ink compositions in embodiments may be liquid or solid at room temperature. It is desired for the phase-change radiation-curable ink compositions to have a viscosity of less than about 50 mPa·s, such as less than about 30 mPa·s, for example from about 3 to about 30 mPa·s, from about 5 to about 20 mPa·s, or from about 8 to about 13 mPa·s, at the temperature of jetting. In particular embodiments, the ink compositions are jetted at low temperatures, in particular at temperatures below about 110° C., for example about 40° C. to about 110° C. about 50° C. to about 110° C., or about 60° C. to about 90° C., although the jetting temperature can be outside these ranges.

At such low jetting temperatures, the conventional use of temperature differential between the jetted ink composition and the substrate upon which the ink composition is jetted in order to effect a rapid phase change in the ink composition (i.e., from liquid to solid) may not be effective. The gellant can thus be used to cause a rapid viscosity increase in the jetted ink composition upon the substrate. In particular, jetted ink droplets would be pinned into position on a receiving substrate such as an image-receiving medium (e.g., paper) or an intermediate-transfer member (e.g., a transfuse drum or belt) that is at a temperature cooler than the ink-jetting temperature of the ink composition through the action of a phase-change transition in which the ink composition undergoes a significant viscosity change from a liquid state to a gel state (or semi-solid state).

In embodiments, the temperature at which the ink composition forms the gel state is any temperature below the jetting temperature of the ink composition, for example any temperature that is about 5° C. or more below the jetting temperature of the ink composition. In embodiments, the gel state may be formed at temperatures from about 25° C. to about 100° C., such as from about 30° C. to about 70° C., or from about 30° C. to about 50° C., although the temperature can be outside this range. There is a rapid and large increase in ink viscosity upon cooling from the jetting temperature at which the ink composition is in a liquid state, to the gel transition temperature at which the ink composition converts to the gel state. The ink composition of some embodiments may show at least a $10^{2.5}$-fold increase in viscosity.

Optimum transfer efficiency from an intermediate transfer surface and optimum print quality may be achieved if the viscosity of the ink image deposited on the drum is greatly increased after jetting the ink composition, so as to obtain a stable and transferable image that will not smear. A suitable gellant for the ink composition would gel the monomers/oligomers in the ink vehicle quickly and reversibly, and demonstrate a narrow phase-change transition, for example within a temperature range of about 30° C. to about 100° C., such as about 30° C. to about 70° C., although the transition range may also be outside of these temperature ranges. The gel state of exemplary ink compositions should exhibit a minimum of $10^{2.5}$ mPa·s, such as $10^3$ mPa·s, increase in viscosity at transferring temperatures, e.g., from about 30° C. to about 70° C., compared to the viscosity at the jetting temperature. In particular embodiments, the gellant-containing ink compositions rapidly increase in viscosity within 5° C. to 10° C. below the jetting temperature and ultimately reach a viscosity above $10^4$ times the jetting viscosity, for example about $10^5$ times the jetting viscosity. In direct-to-paper applications, increases in viscosity greater than $10^6$, white providing minimal show-through or feathering of the image, tend to have insufficient drop spread and may preserve undesirable artifacts of jetting, such as drop structure. In intermediate-transfer architectures, the ink image can be spread and smoothed by external pressure allowing much higher increases in viscosity by the gellant-containing ink compositions. However, curing an ink composition having a high viscosity, such as greater than $10^7$ mPa·s, is difficult to do efficiently without reheating the ink composition because of the limited mobility of the free radical reactants. Further, in embodiments that employ intermediate transfer of the image, the gellant-containing ink compositions may have good elastic properties to enable complete transfer from the drum, a property that can be inferred from the value of the storage modulus (G' max) at the transfuse temperature.

When the ink compositions of embodiments are in the gel state, the viscosity of the ink composition is at least about 1,000 mPa·s, such as at least about 10,000 mPa·s, or at least about 100,000 mPa·s. The viscosity values in the gel state of exemplary ink compositions may be in the range of from about $10^3$ to about $10^9$ mPa·s, such as from about $10^{4.5}$ to about $10^{6.5}$ mPa·s, although the gel-phase viscosity can be outside of these ranges. Gel-phase viscosity of embodiments call vary with the print process. For example, the highest viscosities may be preferred for use in exemplary embodiments that employ intermediate transfer, or when jetting directly to porous paper in order to minimize the effects of ink bleed and feathering. On the other hand, less porous substrates, such as plastic, may require lower viscosities that control dot gain and agglomeration of individual ink pixels. The gel viscosity can be controlled by ink formulation and substrate temperature. An additional benefit of the gel state for radiation-curable gellant-containing ink compositions is that higher viscosities of about $10^3$-$10^4$ mPa·s can reduce oxygen diffusion, which in turn leads to a faster rate of cure in free-radical initiation.

Radiation-Curable Co-Monomers

In embodiments, the ink vehicle may include one or more co-monomers. In particular embodiments, at least a first and a second co-monomer, which are different from each other, may be included in the ink vehicle. In such embodiments, the combination of the different co-monomers aids in solubilizing the gellant material.

Ink compositions of embodiments may comprise a first and a second co-monomer, due to the solubility and gelling properties of gellant materials, such as, epoxy-polyamide composite gellants, which are useful for producing ink compositions including an ink vehicle having a thermally-driven and reversible gel phase, where the ink vehicle is comprised of liquid UV-curable monomers. The gel phase of such ink compositions allows an ink droplet to be pinned to a receiving substrate. However, ink compositions that include gellants, such as epoxy-polyamide composite gellants, are often cloudy and can be difficult to filter. In some cases, filtration can remove the cloudiness only to have it reappear upon standing.

By combining two or more different monomers in the ink vehicle of embodiments solubility and gelling properties of gellants, such as epoxy-polyamide composite gellants, may be improved in UV-curable monomers and their mixtures. As a result of improved filtration performance, exemplary ink compositions exhibit more robust jetting and higher gel viscosity.

The first and second co-monomers may be chosen from any suitable radiation curable monomers, including cationically curable monomers, radically curable monomers, and photocurable monomers.

Cationically curable monomers may include, for example, cycloaliphatic epoxide, and, in embodiments, one or more polyfunctional cycloaliphatic epoxides. Multifunctional vinyl ethers can also be used. Additional suitable examples of cationically curable monomers/oligomers for use in embodiments are disclosed in U.S. patent application Ser. No. 11/289,473, the entire disclosure of which is incorporated herein by reference, and include monomers/oligomers of the following formulas (1)-(6).

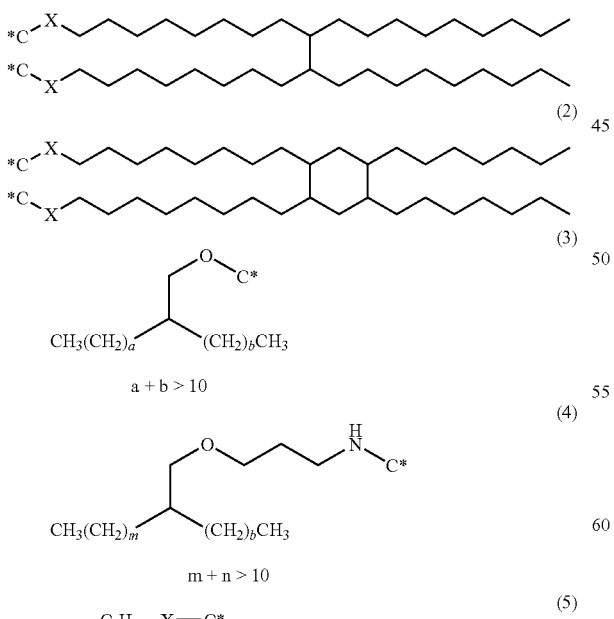

in which y > 9 for branched
and straight-chain compounds

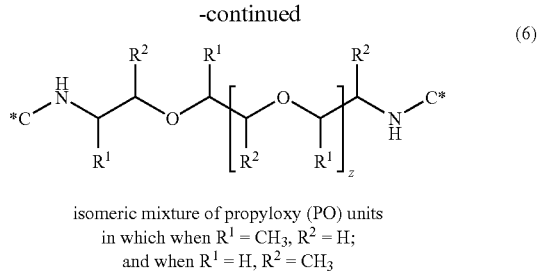

isomeric mixture of propyloxy (PO) units
in which when $R^1 = CH_3$, $R^2 = H$;
and when $R^1 = H$, $R^2 = CH_3$ In the foregoing, X may be O or NH, and C* may be represented by the following formulas (7)-(10).

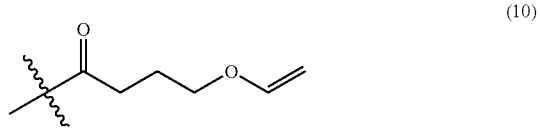

to the activity of polyamide towards radical polymerization, may include, for example, acrylate and methacrylate monomers. As relatively non-polar monomers, mention may be made of isobornyl(meth)acrylate, lauryl(meth)acrylate, isodecyl(meth)acrylate, caprolactone acrylate, 2-phenoxyethyl acrylate, isooctyl(meth)acrylate, and butyl acrylate. In addition, multifunctional acrylate monomers/oligomers may be used not only as reactive diluents, but also as materials that can increase the cross-link density of the cured image, thereby enhancing the toughness of the cured images. As multifunctional acrylates and methacrylates, mention may be made of pentaerythritol tetra(meth)acrylate, 1,2 ethylene glycol di(meth)acrylate, 1,6 hexanediol di(meth)acrylate, 1,12-dodecanol di(meth)acrylate, tris(2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine-modified polyether acrylates (available as PO 83 F, LR 8869, and/or LR 8889 (all available from BASF Corporation)), trimethylolpropane triacrylate, glycerol propoxylate triacrylate, dipentaerythritol penta-/hexa-acrylate, ethoxylated pentaerythritol tetraacrylate (available from Sartomer Co. Inc. as SR 494), caprolactone acrylate (available from Sartomer Co. Inc. as SR 495B), and the like.

In embodiments, the first co-monomer may be chosen from short-chain alkyl glycol diacrylates or ether diacrylates, such as propoxylated neopentyl glycol diacrylate, and the second co-monomer may be chosen from acrylates having short-chain alkyl ester substituents, such as caprolactone acrylate, and the commercially available products CD536, CD 2777, CD585 and CD586 (available from Sartomer Co. Inc.). While not wishing to be bound by theory, it is believed that the second co-monomer improves the solvency of the vehicle for the gellant by increasing the polarity of the vehicle. Thus, caprolactone acrylate may be particularly useful as the first co-monomer because it has both polar ester linkages and a terminal hydroxyl group.

The radiation-curable phase-change ink compositions of embodiments may include the first co-monomer in an amount ranging from about 20 to about 80% by weight, such as from about 50 to about 75% by weight or from about 40 to about 70% by weight, relative to the total weight of the ink vehicle, and the second co-monomer is present in an amount ranging from about 10 to about 60% by weight, such as from about 15 to about 55% by weight, relative to the total weight of the ink vehicle, although the value can also be outside of these ranges.

The radiation-curable phase-change ink compositions of embodiments may include the first and second co-monomers in a ratio such that ratio of the first co-monomer to the second co-monomer is between about 75 parts to about 15 parts and about 55 parts to about 35 parts, such as about 65 parts to about 25 parts.

Curable Gellants

In embodiments, at least one of the one or more gellants in the ink vehicle is a composite material comprised of a polymerizable epoxy resin that is chemically functionalized with either ethylenically unsaturated groups or hydrocarbon groups or combinations thereof, and a polyamide resin based on a polymerized fatty acid and a polyamine, and an optional reactive diluent that optionally contains unsaturated functional groups.

Curable Epoxy-Polyamide Composite Gellants

In embodiments, the ink vehicle comprises at least one gellant that comprises a curable epoxy-polyamide composite gellant. Curable epoxy-polyamide composite gellants, which are comprised of epoxy resin and polyamide resin, exhibit a thermally reversible and narrow gel-phase transition when formulated into a phase-change radiation-curable ink composition. Suitable curable epoxy-polyamide composite gellants for use in embodiments include those described in co-pending U.S. patent application Ser. No. 11/136,525, the entire disclosure of which is incorporated herein by reference.

The epoxy resin component in the composite gellant can be any suitable epoxy group-containing material. In embodiments, the epoxy resin component may be selected from among the diglycidyl ethers of either polyphenol-based epoxy resin or a polyol-based epoxy resin, or mixtures thereof. That is, the epoxy resins of embodiments may have two epoxy functional groups that may be located at the terminal ends of the molecule. The polyphenol-based epoxy resin may be a bisphenol A-co-epichlorohydrin resin with not more than two glycidyl ether terminal groups. The polyol-based epoxy resin of embodiments may be a dipropylene glycol-co-epichlorohydrin resin with not more than two glycidyl ether terminal groups. Suitable epoxy resins may have a weight-average molecular weight in the range of about 200 to about 800, such as of about 300 to about 700. Commercially available sources of the epoxy resins are, for example, the bisphenol A-based epoxy resins from Dow Chemical Corp. such as DER 383, or the dipropyleneglycol-based resins from Dow Chemical Corp. such as DER 736. Other sources of epoxy-based materials originating from natural sources may be used, such as epoxidized triglyceride fatty esters of vegetable or animal origins, for example epoxidized linseed oil, rapeseed oil and the like, or mixtures thereof. Epoxy compounds derived from vegetable oils such as the VIKOFLEX line of products from Arkema Inc. may also be used.

Further, the epoxy resin component may contain at least one ethylenically unsaturated functional group that is curable via free-radical initiation and enables chemical bonding of the gellant to the cured-ink vehicle. The epoxy resin component is thus functionalized with acrylate or (meth)acrylate, vinyl ether, allyl ether and the like, by chemical reaction with unsaturated carboxylic acids or other unsaturated reagents. For example, the terminal epoxide groups of the resin become ring-opened in this chemical reaction, and are converted to (meth)acrylate esters by esterification reaction with (meth) acrylic acid.

Furthermore, the epoxy resin component may additionally be functionalized by reaction with a saturated hydrocarbon monocarboxylic acid comprised of at least 8 carbons, or at least 10 carbons, such as capric acid, lauric acid, myristic acid, stearic acid and 12-hydroxystearic acid, and the like. The saturated monocarboxylic acid may be a linear, non-branched hydrocarbon acid, rather than a branched hydrocarbon acid, the latter which can act to physically disrupt the gellant network structure. The weight-percent ratio of the unsaturated monocarboxylic acid to linear saturated mono-carboxylic acid that is used to chemically functionlalize the epoxy resin component can range from 1:1 to about 20:1, such as from 2:1 to 5:1, but can also be outside of these ranges. The condensation reaction between the terminal epoxide functional groups on the epoxy resin and the unsaturated or saturated carboxylic acids is accelerated by use of a suitable catalyst, for example triphenyl phosphine, bulky tertiary bases such as DABCO, triisopropylamine, alkoxylate salts such as potassium tert-butoxide, and the like. The amount of catalyst used is typically less than 5% by weight, such as less than 1% by weight of total solid components.

As the polyamide component of the epoxy-polyamide composite gellant, any suitable polyamide material may be used without limitation. In embodiments, the polyamide is comprised of a polyamide resin derived from a polymerized fatty acid such as those obtained from natural sources (for example, palm oil, rapeseed oil, castor oil, and the like, including mixtures thereof) or the commonly known hydrocarbon "dimer acids," prepared from dimerized C-18 unsaturated acid feedstocks such as oleic acid, linoleic acid and the like, and a polyamine, which may be a diamine (for example, alkylenediamines such as ethylenediamine, DYTEK® series diamines, poly(alkyleneoxy)diamines, and the like, or also copolymers of polyamides such as polyester-polyamides and polyether-polyamides. One or more polyamide resins may be used in the formation of the curable gellant. Commercially available sources of the polyamide resin include, for example, the VERSAMID series of polyamides available from Cognis Corporation (formerly Henkel Corp.), in particular VERSAMID 335, VERSAMID 338, VERSAMID 795 and VERSAMID 963. all of which have low molecular weights and low amine numbers. The SYLVAGEL® polyamide resins from Arizona Chemical Company, and variants thereof including polyether-polyamide resins may be employed. The composition of the SYLVAGEL® resins obtained from Arizona Chemical Company are disclosed in U.S. Pat. Nos. 6,492,458 and 6,399,713 and U.S. Patent Publication No. 2003/0065084.

The polyamide resin of embodiments may be a low molecular weight polyamide resin, with number-average molecular weight of less than about 15,000 grams per mole, such as than 10,000 grams per mole, and less than 7,000 grams per mole, as determined by gel permeation chromatography (GPC) referenced with a polystyrene standard. The amine number of the polyamide resin is typically low, with values in the range of 0 to 10, for example in the range of 0 to 5.

The curable epoxy-polyamide composite gellants can be prepared by any suitable method. However, such may be prepared by mixing the epoxy resin components with the ethylenically unsaturated group-containing component and optional saturated hydrocarbon monocarboxylic acid, in the presence of the polyamide resin and an esterification catalyst, and then heating the mixture over several hours while stinting sufficiently to blend all of the components so as to obtain a homogeneous mixture. The reaction is allowed to progress for a suitable time period, whereby conversion to the desired products is monitored spectroscopically and by the change in total acid number.

The relative weight-percent ratio of epoxy resin components and polyamide resin components in the gellant composition may range from, for example, 20:1 to 0.1:1, but can also be outside of these ranges. The impact of this ratio upon ink performance is multi-faceted. While the structures of the epoxy resin and polyamide resin components can vary, in general the epoxy resin component provides more solubility in common reactive diluents while the less soluble, more polar polyamide component provides greater gel properties. The epoxy resin component is more readily reacted with acrylic acid to provide acrylate functionality than the polyamide resin, and thus imparts higher levels of cure to the final image.

An illustration of the effect of the epoxy resin to polyamide resin ratio with a particular selection of the respective resins upon the storage modulus G' of the ink may be seen from the fact that at a ratio of 1.3:1.0, the storage modulus of the ink is $7 \times 10^3$ Pa and the ratio of jetting viscosity to gel viscosity at 30° C. is $1.5 \times 10^5$, while at a ratio of 0.5:1.0, the storage modulus is $3.4 \times 10^2$ Pa and the ratio of jetting viscosity to gel viscosity at 30° C. is $9.4 \times 10^3$.

The results indicate that two gellants with different relative ratios of the same epoxy resin and polyamide resin components can exert a dramatically different effect on the viscoelastic behavior of the ink composition.

The polyamide resin is believed to function as the principal gelling agent in the composite gellant, since polyamides, and amide groups in general, are known to form extensive hydrogen-bonded networks in the presence of other solvents or components that are proton sources, including alcohols, phenols, amines and carboxylic acids.

The radiation-curable phase-change ink compositions of embodiments may be comprised of the curable epoxy-polyamide composite gellant in an amount from about 1 to about 50% by weight of the ink composition, such as from about 5 to about 25% by weight or from about 7 to about 15% by weight, although the value can also be outside of this range.

For example, where the organic gellant is cationically curable (e.g., wherein the curable functional groups include epoxy, vinyl ether, allyl, styrene and other vinyl benzene derivatives, or oxetane groups), additional cationically curable monomers or oligomers may be included in the ink vehicle.

Curable Amide Gellants

In some embodiments, an additional gellant material, such as an amide gellant, may be incorporated into the ink vehicle. For example, embodiments in which the gellant material includes an epoxy-polyamide composite gellant and an amide gellant may have a higher gel viscosity than can be achieved by an epoxy-polyamide composite gellant alone. Ink compositions that have higher gel viscosities may achieve improved show-through characteristics.

Suitable gellant materials that may be included in embodiments in combination with an epoxy-polyamide composite gellant, include amide gellants.

As the amide gellant, compounds of the following formula (11) may be used,

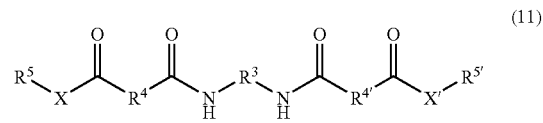

(11)

In formula (11), $R^3$ may be chosen from:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), with from, for example, 1 to about 20 carbon atoms in the alkylene chain, such as from 1 to about 12 or from 1 to about 4 carbon atoms, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), with from, for example, about 5 to about 20 carbon atoms in the arylene chain, such as from about 6 to about 14 or from about 6 to about 10 carbon atoms, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), with from, for example, about 6 to about 32 carbon atoms in the arylalkylene chain, such as from about 7 to about 22 or from about 7 to about 20 carbon atoms, and (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), with from, for example, about 6 to about 32 carbon atoms in the alkylarylene chain, such as from about 7 to about 22 or from about 7 to about 20 carbon atoms, wherein the substituents on the substituted alkylene, arylene, arylalkylene, and alkylarylene groups can be, for example, halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring.

In formula (11), $R^4$ and $R^{4'}$ may be chosen, independently from:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), with from, for example, 1 to about 54 carbon atoms in the alkylene chain, such as from 1 to about 44 or from 1 to about 36 carbon atoms, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), with from, for example, 5 to about 14 carbon atoms in the arylene chain, such as from 6 to about 14 or from 7 to about 10 carbon atoms, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), with from, for example, about 6 to about 32 carbon atoms in the arylalkylene chain, such as from about 7 to about 22 or from 8 to about 20 carbon atoms, and (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), with from, for example, about 6 to about 32 carbon atoms in the alkylarylene chain, such as from about 7 to about 22 or from about 7 to about 20 carbon atoms, wherein the substituents on the substituted alkylene, arylene, arylalkylene, and alkylarylene groups can be, for example, halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring.

In formula (11), $R^5$ and $R^{5'}$ may be chosen, independently from:

(a) photoinitiating groups, such as groups derived from 1-(4-(2-hydroxyethoxy)phenyl)-2-hydroxy-2-methylpropan-1-one (formula (12)),

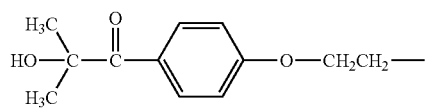

(12)

groups derived from 1-hydroxycyclohexylphenylketone (formula (13)),

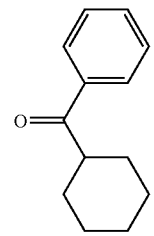

(13)

groups derived from 2-hydroxy-2-methyl-1-phenylpropan-1-one (formula (14)), and

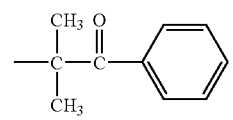

(14)

groups derived from N,N-dimethylethanolamine or N,N-dimethylethylenediamine (formula (15)) or the like; and

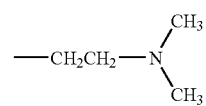

(15)

(b) a group chosen from:

(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), with from, for example, about 2 to 100 carbon atoms in the alkyl chain, such as from about 3 to about 60 or from about 4 to about 30 carbon atoms, (ii) an aryl group (including substituted and unsubstituted aryl groups, and wherein heteroatoms, such as oxygen, nitrogen, sulfur, silicon, phosphorus, boron, and the like either may or may not be present in the aryl group), with from, for example, about 5 to about 100 carbon atoms on the aryl chain, such as from about 5 to about 60 or from about 6 to about 30 carbon atoms, such as phenyl or the like, (iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), with from, for example, about 6 to about 100 carbon atoms on the arylalkyl chain, such as from 6 to about 60 or from about 7 to about 30 carbon atoms, such as benzyl or the like, and (iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), with from, for example, about 6 to about 100 carbon atoms in the alkylaryl chain, such as from about 6 to about 60 or from about 7 to about 30 carbon atoms, such as tolyl or the like, wherein the substituents on the substituted alkyl, arylalkyl, and alkylaryl groups can be, for example, halogen atoms, ether groups, aldehyde groups, ketone groups, ester groups, amide groups, carbonyl groups, thiocarbonyl groups, sulfide groups, phosphine groups, phosphonium groups, phosphate groups, nitrile groups, mercapto groups, nitro groups, nitroso groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In formula (11), X and X' may be, independently an oxygen atom or a group of the formula $-NR^6-$, wherein $R^6$ is chosen from:

(i) a hydrogen atom;

(ii) an alkyl group, including linear and branched, saturated and unsaturated, cyclic and acyclic, and substituted and unsubstituted alkyl groups, and wherein heteroatoms either may or may not be present in the alkyl group, with from, for example, 1 to about 100 carbon atom in the alkyl chain, such as from 1 to about 60 or from 1 to about 30 carbon atoms;

(iii) an aryl group, including substituted and unsubstituted aryl groups, and wherein heteroatoms either may or may not be present in the aryl group, with from, for example, about 5 to about 100 carbon atoms in the aryl chain, such as from about 5 to about 60 or about 6 to about 30 carbon atoms;

(iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, with from, for example, about 6 to about 100 carbon atoms in the arylalkyl group, such as from about 6 to about 60 or from about 7 to about 30 carbon atoms; and (i) v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, with from, for example, about 6 to about 100 carbon atoms in the alkylaryl chain, such as from about 6 to about 60 or from about 7 to about 30 carbon atoms, wherein the substituents on the substituted alkyl, aryl, arylalkyl, and alkylaryl groups can be, for example, halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In some embodiments, $R^4$ and $R^{4'}$ are the same as each other; in other embodiments, $R^4$ and $R^{4'}$ are different from each other. Similarly, in some embodiments, $R^5$ and $R^{5'}$ are the same as each other; in other embodiments, $R^5$ and $R^{5'}$ are different from each other.

In embodiments, $R^4$ and $R^{4'}$ are each groups of the formula $-C_{34}H_{56+a}-$ and are branched alkylene groups which may include unsaturations and cyclic groups, wherein a is an integer of 0, 1, 2, 3, 4, 5, 6, 7, 8, 9, 10, 11, or 12, including, for example, isomers of formula (16).

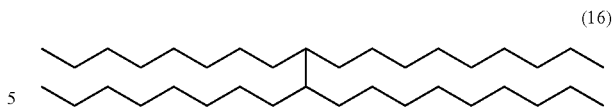

(16)

In embodiments, $R^3$ is an ethylene ($-CH_2CH_2-$) group.

In embodiments, at least one of $R^5$ and $R^{5'}$ may be represented by formula (17).

$$H_2C=CH-O-(CH_2)_4- \quad (17)$$

In embodiments, at least one of $R^5$ and $R^{5'}$ may be represented by formula (18).

$$H_2C=CH-O-(CH_2)_2-O-(CH_2)_2- \quad (18)$$

In embodiments, at least one of $R^5$ and $R^{5'}$ may be represented by formula (19).

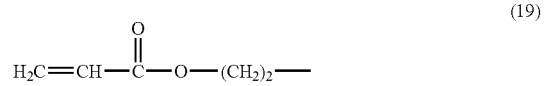

(19)

In embodiments, at least one of $R^5$ and $R^{5'}$ may be represented by formula (20).

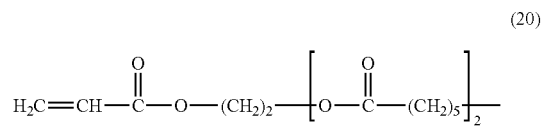

(20)

In embodiments, at least one of $R^5$ and $R^{5'}$ may be represented by the formula (21), in which p is an integer representing the number of repeating $[O-(CH_2)_2]$ units, and may be, in particular embodiments 2 or 5.

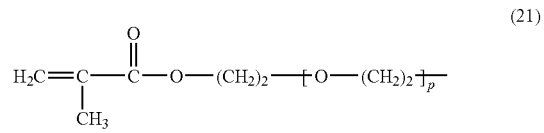

(21)

In embodiments, at least one of $R^5$ and $R^{5'}$ may be represented by formula (22).

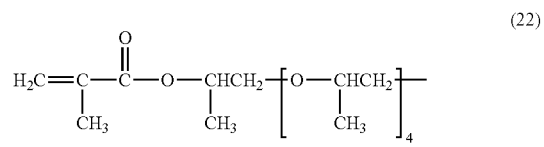

(22)

In embodiments, at least one of $R^5$ and $R^{5'}$ may be represented by formula (12).

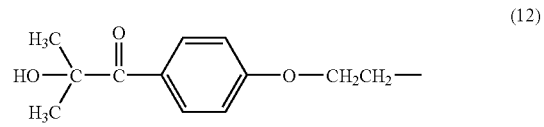

(12)

In embodiments, the gellant may be a mixture of components. For example, in some embodiments, the gellant may be a mixture of components representable by formulas (23)-(25), in which $-C_{34}H_{56+a}-$ represents a branched alkylene group that may include unsaturations and cyclic groups, and a is an integer of in the range of 0-12, inclusive. In some such embodiments, these compounds may present in molar ratios (23):(24):(25) of about 1:2:1.

(23)
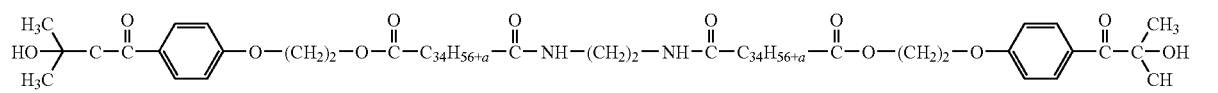
(24)
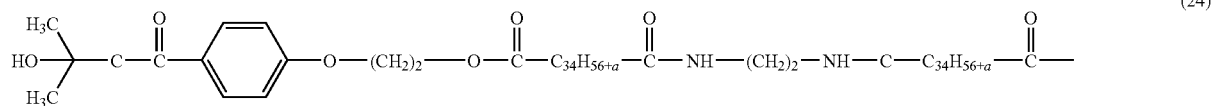
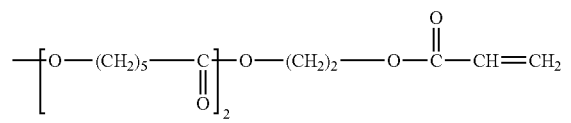
(25)
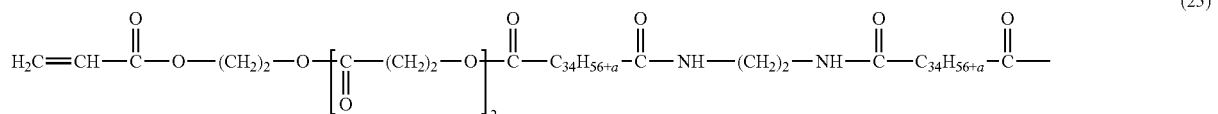
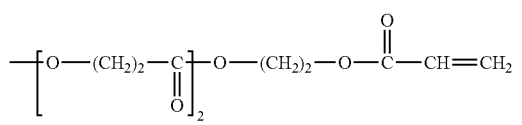
Compounds of the following formula (26) may also be used as the amide gellant of embodiments. In formula (26), —$C_{34}H_{56+a}$— represents a branched alkylene group that may include unsaturations and cyclic groups, and a is an integer of in the range of 0-12, inclusive, including isomers such as those represented by formulas (25), (27) and (28), and mixtures thereof.
(26)
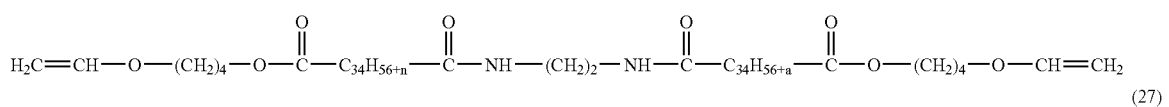
(27)
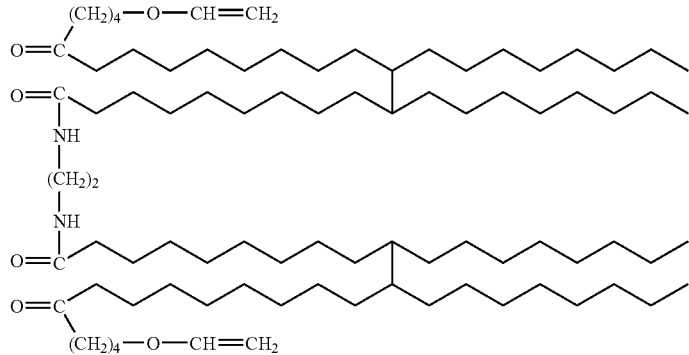
(28)
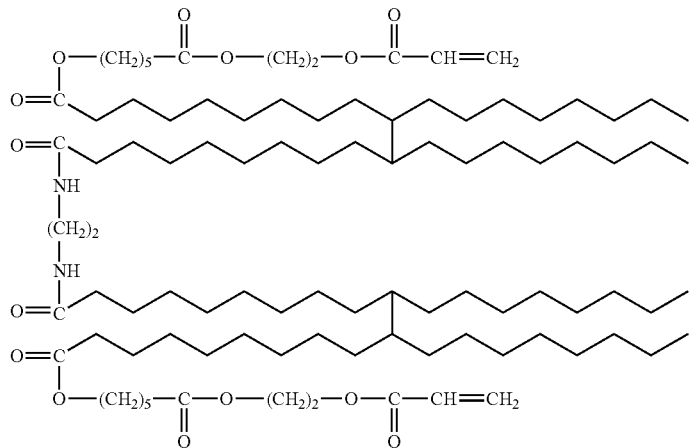

The gellant compounds of embodiments may be prepared by any desired or effective method. For example, in one specific embodiment, about two molar equivalents of a diacid of the formula HOOC—$R^6$—COOH, about one molar equivalent of a diamine of the formula $H_2N$—$R^7$—$NH_2$ and about two molar equivalents of a monoalcohol of the formula $R^8$—OH may be reacted by use of the coupling agent such as 1,3-dicyclohexylcarbodiimide (DCC) in the presence of a catalyst such as 4-dimethylaminopyridine (DMAP), in the presence of an optional solvent such as methylene chloride ($CH_2Cl_2$). The ingredients may be mixed together and a one-pot reaction may be employed. More specifically, the diacid, the diamine, and the coupling agent may be mixed together in a first step, and the monoalcohol may be added to the reaction mixture in a second step. Such a reaction may proceed as shown the following reaction scheme (A), in which A is a coupling agent as described below.

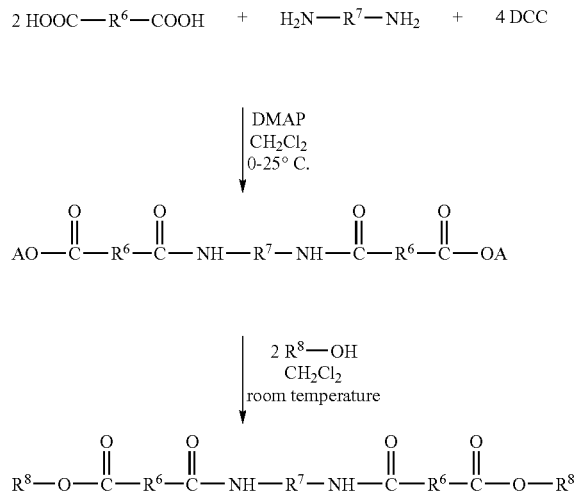

In such embodiments, the diacid and the diamine may be present in any desired or effective relative amounts. For example, the ratio of diamine to diacid may be from about 0.4 mole to about 0.57 mole of diamine per mole of diacid, such as from about 0.45 mole of diamine to about 0.53 mole per mole of diacid, or from about 0.5 mole to about 0.51 mole of diamine per mole of diacid.

Also in such embodiments, the diacid and the monoalcohol may be present in any desired or effective relative amounts. For example, the ratio of monoalcohol to diacid may be from about 0.75 mole to about 1.5 moles of monoalcohol per mole of diacid, such as from about 0.9 mole of monoalcohol to about 1.4 moles per mole of diacid, or from about 1 mole to about 1.25 moles of monoalcohol per mole of diacid.

In addition, the diamine and the monoalcohol may be present in any desired or effective relative amounts. For example, the ratio of monoalcohol to diamine may be from about 1.5 moles to about 2.5 moles of monoalcohol per mole of diamine, such as from about 1.75 moles of monoalcohol to about 2.4 moles per mole of diamine, or from about 2 moles to about 2.25 moles of monoalcohol per mole of diamine.

Suitable coupling agents for use in reactions such as those disclosed above include 1,3-dicyclohexylcarbodiimide (DCC), which has formula (29) below, 1-(3-(dimethylamino)propyl)3-ethylcarbodiimide HCl (EDCl), N,N-carbonyldiimidazole, N-cyclohexyl-N'-(2-morpholinoethyl)-carbodiimide methyl-p-toluenesulfonate, (benzotriazol-1-yloxy)tris(dimethylamino)phosphonium hexafluorophosphate (BOP), (o-benzotriazol-1-yl)-N,N,N',N'-bis(tetramethylene)uronium hexafluorophosphate (HBTU), bis(2-oxo-3-oxazolidinyl)phosphonic chloride (BOP—Cl), (1H-1,2,3-benzotriazol-1-yloxy)tris(pyrrolidino)phosphonium hexafluorophosphate (PyBOP), and the like, as well as mixtures thereof.

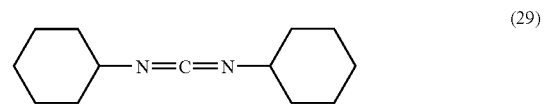

(29)

In such embodiments, the diacid and the coupling agent may be present in any desired or effective relative amounts. For example, the ratio of diacid to coupling agent may be from about 0.4 mole to about 0.57 mole of diacid per mole of coupling agent, such as from about 0.45 mole of diacid to about 0.53 mole per mole of coupling agent, or from about 0.5 mole to about 0.51 mole of diacid per mole of coupling agent.

Examples of suitable catalysts for use in such reactions include 4-dimethylaminopyridine (DMAP), which has formula (30) below, triethylamine, 1,8-diazabicyclo[5.4.0]undec-7-ene (DBU), and the like, as well as mixtures thereof.

(30)

In such embodiments, the catalyst and the diacid may be present in any desired or effective relative amounts. For example, the ratio of catalyst to diacid may be from about 0.05 mole to about 1 mole of catalyst per mole of diacid, such as from about 0.1 mole of catalyst to about 0.8 mole per mole of diacid, or from about 0.2 mole to about 0.5 mole of catalyst per mole of diacid.

Inclusion of a solvent in the reaction system is optional. However, any desired or effective solvent can be employed. Examples of suitable solvents include methylene chloride, tetrahydrofuran, methyl ethyl ketone, toluene, dimethyl formamide, diethyl ether, hexane, ethyl acetate, and the like, as well as mixtures thereof.

When included, solvent may be present in any desired or effective amount. For example, the solvent may be present as one liter of solvent for amounts of diacid in a range of from about 30 grams to about 150 grams, such as from about 40 grams to about 125 grams or from about 50 grams to about 100 grams.

In embodiments, the first reaction step, in which the diacid and the diamine are reacted, may be carried out at any desired or effective temperature. In embodiments, the first reaction step may be conducted at a temperature in a range of from −5° C. to about 10° C., such as from about −2.5° C. to about 5° C. or from about 0° C. to about 2° C.

In embodiments, the second reaction step, in which the reaction product of the diacid and the diamine is reacted with the monoalcohol, may be carried out at any desired or effective temperature. In embodiments, the second reaction step may be conducted at a temperature in a range of from 15° C. to about 45° C., such as from about 20° C. to about 35° C. or from about 25° C. to about 30° C.

The first and second reaction steps may be carried out over any desired or effective period of time. For example, embodiments may be conducted over total reaction times of from about 1 to about 10 hours, such as from about 2 to about 7 hours, or from about 4 to about 5 hours.

Once both the first and second reaction steps have been completed, the final reaction product can be isolated by filtration of any solid by-products, or by washing the solution with water depending on the activating agent used. The solvent may he removed by rotary evaporation. If needed, the product can be purified by washing with acetone and drying.

The radiation curable phase change ink compositions of embodiments may be comprised of an epoxy-polyamide gellant and an amide gellant. The total amount of the epoxy-polyamide gellant and the amide gellant is about 15 weight percent or less, relative to a total weight of the ink vehicle. The amide gellant may be present in an amount ranging from about 0.25 to about 75% by weight or in an amount ranging from about 25 to about 50% by weight, relative to the total weight of gellant materials, although the value can also be outside of this range.

Optional Additives

The ink vehicles of embodiments may be mixtures of curable components and, optionally, additional materials including reactive diluents, colorants, initiating agents, antioxidants, as well as any conventional optional additives.

Colorants

The ink compositions also contain a colorant. Any desired or effective colorant can be employed in the ink compositions, including dyes, pigments, mixtures thereof, and the like, provided that the colorant can be dissolved or dispersed in the ink vehicle. Pigments, which are typically cheaper and more robust than dyes, may be included in particular embodiments. The color of many dyes can be altered by the polymerization process occurring during the curing stage, presumably from attack of their molecular structure by the free radicals. The compositions can be used in combination with conventional ink-colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Also suitable for use in embodiments are solvent dyes, such as spirit soluble dyes, because of their compatibility with the ink vehicles of embodiments. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm, and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF). Sudan Blue 670 [C.I. 61554] (BASF), Sudan Yellow 146 [C.I. 12700] (BASF), Sudan Red 462 [C.I. 260501] (BASF), and the like.

Pigments are also suitable colorants for the inks. Examples of suitable pigments include but are not limited to, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFASTt® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PACO®C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF), PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASLA Magenta (DU PONT), PALIOGEN Black L0084 (BASF); Pigment Black K801 (BASF); and carbon blacks such as REGAL 330™ (Cabot), Carbon Black 5250, Carbon Black 5750 (Columbia Chemical), mixtures thereof and the like.

The colorant may be included in the ink composition in an amount of from, for example, about 0.1 to about 15% by weight of the ink composition, such as about 2.0 to about 8% by weight of the ink composition.

Initiators

The radiation-curable phase-change ink may also include an initiator in embodiments where an initiator is desirable for assisting in curing of the ink. As mentioned above, the initiator may be a thermal initiator and/or a photoinitiator. Suitable thermal initiators include ones that undergo temperature-induced decomposition to form organic radical species, and proceed to cure the ink by free-radical polymerization of components containing ethylenically unsaturated groups. In some embodiments, the initiators may be thermal initiators that are rated with a ten-hour half-life at high temperatures, for example above 120° C., including organic peroxides such as t-butyl cumyl peroxide, di(t-amyl)peroxide, 2,5-di(t-butylperoxy)-2,5-dimethyl-3-hexyne, cumene hydroperoxide, t-butyl hydroperoxide, and the like.

A photoinitiator that absorbs radiation, for example UV light radiation, to initiate curing of the curable components of the ink may be used. As the photoinitiator for ink compositions of embodiments that are cured by free-radical polymerization, e.g., ink compositions containing acrylate groups or inks comprised of polyamides, mention may be made of photoinitiators such as benzophenones, benzoin ethers, benzil ketals, α-hydroxyalkylphenones, α-aminoalkylphenones and acylphosphine photoinitiators sold under the trade designations of IRGACURE and DAROCUR from Ciba. Specific examples of suitable photoinitiators include 2,4,6-trimethylbenzoyldiphenylphosphine oxide (available as BASF LUCIRIN TPO); 2,4,6-trimethylbenzoylethoxyphenylphosphine oxide (available as BASF LUCIRIN TPO-L); bis(2,4,6-trimethylbenzoyl)-phenyl-phosphine oxide (available as Ciba IRGACURE 819) and other acyl phosphines; 2-methyl-1-(4-methylthio)phenyl-2-(4-morphorlinyl)-1-propanone (available as Ciba IRGACURE 907) and 1-(4-(2-hydroxyethoxy)phenyl)-2-hydroxy-2-methylpropan-1-one (available as Ciba IRGACURE 2959); 2-benzyl 2-dimethylamino 1-(4-morpholinophenyl)butanone-1(available as Ciba IRGACURE 369)); 2-hydroxy-1-(4-(4-(2-hydroxy-2-methylpropionyl)-benzyl)-phenyl)-2-methylpropan-1-one (available as Ciba IRGACURE 127); 2-dimethylamino-2-(4-methylbenzyl)-1-(4-morpholin-4-ylphenyl)-butanone (available as Ciba IRGACURE 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl)phosphine oxide; 2,4,6-trimethylbenzoylphenylphosphinic acid ethyl ester; oligo(2-hydroxy-2-methy-1-(4-(1-methylvinyl)phenyl)propanone); 2-hydroxy-2-methyl-1-phenyl-1-propanone; benzyl-dimethylketal; and mixtures thereof. Mention may also be made of amine synergists, i.e., co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the flee-radical reaction upon exposure to a desired wavelength of radiation such as UV light can be used without limitation.

In embodiments, the photoinitiator may absorb radiation of about 200 to about 420 nm wavelengths in order to initiate cure, although use of initiators that absorb at longer wavelengths, such as the titanocenes that may absorb up to 560 nm, can also be used without restriction.

The total amount of initiator included in the ink composition may be from, for example, about 0.5 to about 15% by weight, such as from about 1 to about 100% by weight, of the ink composition.

Antioxidants

The radiation-curable phase-change ink compositions can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ I-403, and NAUGARD™ 959, commercially available from Crompton Corporation, Middlebury, Conn.; IRGANOX™ 1010, and IRGASTAB UV 10, commercially available from Ciba Specialty Chemicals; GENORAD 16 and GENORAD 40 commercially available from Rahn AG, Zurich, Switzerland, and the like.

When present, the optional antioxidant is present in the ink compositions of embodiments in any desired or effective amount, such as at least about 0.01% by weight of the ink composition, at least about 0.1% by weight of the ink composition, or at least about 1% by weight of the ink composition.

Conventional Additives

The radiation-curable phase-change inks of embodiments may further include conventional additives to take advantage of the known functionality associated with such conventional additives. Such additives may include, for example, defoamers, slip and leveling agents, pigment dispersants, etc. The inks may also include additional monomeric or polymeric materials as desired.

Ink Composition Preparation and Use

The radiation-curable phase-change inks of embodiments may be prepared by any suitable technique. As an example, the inks may be prepared by first dissolving any initiator components into the reactive diluent or curable monomer and optional oligomers mixture, adding the specified amount of curable composite gellant, which may be less than 50% by weight or less than 15% by weight of the ink composition, heating the mixture to obtain a single phase with low viscosity and thereafter adding this hot mixture slowly to a heated pigment dispersion (which may be a concentrate) while agitating the mixture. The ink composition may then be filtered, optionally at an elevated temperature, through a filter to remove extraneous particles. The method of preparation for the ink compositions may be modified so as to accommodate the type of reactive gelling agents used for the preparation of the ink compositions. For example, a concentrate of the gelling agent may be prepared in one of the components of the ink composition prior to the addition of the other components. Solutions containing co-gelling agents can also be prepared by a method similar to the one described above. Further examples of ink preparation methods are set forth in the Examples below.

The ink compositions described herein may be jetted at temperatures of less than about 110° C., such as from about 40° C. to about 110° C., or from about 65° C. to about 90° C. The ink compositions are thus ideally suited for use in piezoelectric ink jet devices.

The ink compositions may be employed in an apparatus for direct printing ink-jet processes, wherein when droplets of the melted ink are ejected in an imagewise pattern onto a recording substrate, the recording substrate is a final recording substrate. The recording substrate may be at any suitable temperature during recording. In embodiments, the recording substrate may be at room temperature. However, in some embodiments, the substrate may be heated or cooled to have a surface temperature that is, for example, within the range of gel-phase transition temperatures for the ink composition. For example, the substrate may be maintained at a temperature of about 5° C. to about 160° C., such as from about 15° C. to about 50° C., or from about 20° C. to about 40° C. In this way, the jetted ink may be made to rapidly form a gel. Thus, the ink may be heated to a first temperature at which the ink may be jetted, e.g., above the gel-transition temperature of the ink composition, which first temperature may be, for example, from about 50° C. to about 110° C. The second temperature at which the gel forms is less than the first temperature, for example is from about 5° C. to about 75° C., as discussed above.

The ink compositions can also be employed in indirect (offset) printing ink-jet applications, wherein when droplets of the melted ink are ejected in an imagewise pattern onto a recording substrate, the recording substrate is an intermediate-transfer member and the ink in the imagewise pattern is subsequently transferred from the intermediate-transfer member to a final recording substrate.

The ink compositions are suited for jetting onto an intermediate-transfer substrate, e.g., an intermediate-transfuse drum or belt. In a suitable design, the image may be applied by jetting appropriately colored ink compositions during, e.g., four to eighteen rotations (incremental movements) of the intermediate-transfuse member with respect to the ink-jet head, i.e., there is a small translation of the printhead with respect to the substrate in between each rotation. This approach simplifies the printhead design, and the small movements ensure good droplet registration. Transfuse, i.e., a transfer and fusing step, is desirable in forming the image as transfuse enables a high quality image to be built up on a rapidly rotating transfer member. Transfuse typically involves jetting the ink composition from the ink-jet head onto an intermediate-transfer member such as a belt or drum, i.e., the transfuse member. This allows the image to be rapidly built onto the transfuse member for subsequent transfer and fusing to an image-receiving substrate. Alternatively, the same image build-up can be carried out directly on the image substrate, for example, paper.

The intermediate-transfer member may take any suitable form, such as a drum or belt. The member surface may be at room temperature, although in embodiments the member may be heated to have a surface temperature thereof is, for example, within the gel-state temperature range for the ink composition. For example, the surface may be maintained at a temperature of about 25° C. to about 100° C., such as from about 30° C. to about 70° C., or from about 30° C. to about 50° C. In this way, the jetted ink may be made to rapidly form a gel, which gel is maintained on the surface of the transfer member until transfer to the image-receiving substrate. Thus, the ink may be heated to a first temperature at which the ink may be jetted, e.g., above the gel-transition temperature of the ink composition, which first temperature may be, for example, from about 40° C. to about 110° C. The second temperature at which the gel forms is less than the first temperature, for example is from about 25° C. to about 100° C., as discussed above.

Once upon the intermediate-transfer member surface, the jetted ink composition may be exposed to radiation to a limited extent so as to effect a limited curing of the ink upon the intermediate-transfer member surface. This intermediate curing is not to cure the ink composition to its full extent, but merely to assist in setting the jetted ink so that it may be transferred to the image receiving substrate with the appropriate amount of penetration, which requires the ink droplets to have a certain rheology before transfer. For controlling the extent of the curing if an intermediate cure is practiced, reference is made to Co-pending applications Ser. Nos. 11/034, 850 and 11/005,991, each incorporated herein by reference. This intermediate-curing step is not necessary in embodiments in which the gel state is sufficient to impart the desired rheology to the ink droplets.

Following jetting to the intermediate-transfer member and optional intermediate curing thereon, the ink composition is thereafter transferred to an image receiving substrate. The substrate may be any suitable material such as paper, fabric, plastic, glass, metal, etc. Following transfer to the substrate, the ink composition is then cured by exposing the image on the substrate to radiation. For example, radiation having an appropriate wavelength, mainly the wavelength at which the ink initiator absorbs radiation, may be used. This initiates the curing reaction of the ink composition. The radiation exposure need not be long, and may occur for example, about 0.05 to about 10 seconds, such as from about 0.2 to about 2 seconds. These exposure times are more often expressed as substrate speeds of the ink composition passing under a UV lamp. For example, the microwave energized, doped mercury bulbs available from UV Fusion are placed in an elliptical mirror assembly that is 10 cm wide; multiple units may be placed in series. Thus, a belt speed of 0.1 ms$^{-1}$ would require 1 second for a point of an image to pass under a single unit, while a belt speed 4.0 ms$^{-1}$ would require 0.2 seconds to pass under four bulb assemblies. The radiation to cure the polymerizable components of the ink composition of embodiments may be provided by a variety of possible techniques, including heat, a xenon lamp, laser light, D or H bulb, LED, a UV-light source, etc. The curing light may be filtered, if desired or necessary. The curable components of the ink composition react to from a cured or cross-linked network of appropriate hardness. In embodiments, the curing is substantially complete to complete, i.e., at least 75% of the curable components are cured (reacted and/or cross-linked). This allows the ink composition to be substantially hardened, and thereby to be much more scratch resistant, and also adequately controls the amount of show-through on the substrate.

Ink compositions herein, which include curable epoxy-polyamide composite gellants, exhibit a remarkable ability to maintain the image integrity while on the transfer drum surface. This property can be expressed as a reduction of the extent of drop coalescence of the gellant-containing ink compositions of embodiments over inks without gellant. Additionally, little to no ink remains to be removed from the intermediate-transfer member surface following transfer to the image-receiving substrate. While not wishing to be limited by theory, it is believed that better transfer efficiency results from an elastic gel as expressed by the storage modulus G'. As G' increases, particularly as it exceeds the loss modulus G", the gellant-containing ink composition becomes more resilient to the shear stress of the transfer process.

In another embodiment, the recording substrate onto which droplets of the melted ink composition are ejected in an imagewise pattern, whether it is the final recording substrate (in a direct-printing process) or an intermediate-transfer member (in an indirect-printing process), is maintained at a temperature at which the ink composition is in the gel state. Without being limited to any specific theory, it is believed that, in this embodiment, the substrate temperature (either the final substrate or the intermediate-transfer member) is set at an optimum temperature for the formation of a reinforcing gel network. It is believed that the image thus formed will have improved robustness as a result of the reinforcement of the ink vehicle with the gellant. Upon cooling or, in the case of an indirect-printing method, transfer to the final substrate, the gellant network is frozen within the ink vehicle.

When an indirect-printing process is used, the intermediate-transfer member can be of any desired or suitable configuration, such as a drum or roller, a belt or web, a flat surface or platen, or the like. The temperature of the intermediate-transfer member can be controlled by any desired or suitable method, such as by situating heaters in or near the intermediate-transfer member, using air flow to cool the transfer member, or the like. Optionally, a layer of a sacrificial liquid can be applied to the intermediate-transfer member prior to ejecting the droplets of melted ink onto the intermediate-transfer member, whereby the melted ink droplets are ejected onto the sacrificial liquid layer on the intermediate-transfer member, as disclosed in, for example, U.S. Pat. No. 5,389, 958. Transfer from the intermediate-transfer member to the final recording substrate can be made by any desired or suitable method, such as by passing the final recording substrate through a nip formed by the intermediate-transfer member and a back member, which can be of any desired or effective configuration, such as a drum or roller, a belt or web, a flat surface or platen, or the like. Transfer can be carried out at any desired or effective nip pressure, for example from about 5 pounds per square inch to about 2,000 pounds per square inch, such as from about 10 to about 200 pounds per square inch, although the pressure can be outside of these ranges. The transfer surface may be hard or soft and compliant. Subsequent to transfer, the image on the substrate is cured. The radiation to cure the photo-polymerizable components of the ink composition may be provided by a variety of possible techniques, including but not limited to a xenon lamp, laser light, medium pressure mercury lamps, micro-wave excited mercury lamps often known as a H bulb, doped mercury lamps often referred to as D or V bulbs, LED etc. Without being limited to any specific theory, it is believed that in this embodiment, the ink composition is transferred to the final recording substrate in a semi-solid state, facilitating penetration of the ink composition into the final substrate (paper fibers, for example) and enabling improved adhesion, reduced show-through, and reduced pile height.

The following examples of radiation-curable phase-change ink compositions further illustrate the foregoing embodiments.

EXAMPLES

Example 1

Epoxy Polyamide Gellant Preparation

A curable epoxy-polyamide composite gellant was prepared as follows. In a 200-ml round-bottom flask equipped with reflux condenser, thermometer and addition funnel, was charged a bisphenol A-co-epichlorohydrin epoxy resin available from Dow Chemical as DER 383 resin (40 g), polyamide resin VERSAMID 795 available from Cognis Corp. (40 g), and triphenylphosphine as catalyst (35 g). The mixture was heated to 90° C. and stirred for 1 hour, after which time was first added a prepared solution of acrylic acid (14.25 g) and 4-methoxyphenol as polymerization inhibitor (0.05 g), followed with a second prepared solution containing lauric acid (5.0 g) and triphenylphosphine (35 g). The temperature of the reaction mixture was increased to 115° C. and stirred for an additional 3 hours, thereby forming the acrylate-modified epoxy-polyamide composite gellant. The product was obtained as a clear, pale yellow, gelatinous material. $^1$H-NMR spectroscopic analysis (300 MHz, CDCl$_3$) of this material shows the presence of a new set of acrylate hydrogens that differed in chemical shift from those of acrylic acid, and did not clearly reveal the presence of any unreacted epoxy-group hydrogens.

The solubility of the gellant of Example 1 in a typical ink vehicle, propoxylated (2) neopentyl glycol diacrylate (SR9003), and in a co-monomer mixture of propoxylated (2) neopentyl glycol diacrylate and caprolactone acrylate (SR495) was investigated. The 10% by weight gallant of Example 1 was mixed with varying solvent ratios at 90° C. until completely dissolved. The ratios between the two monomers and the solubility of the gellant are given in Table 1.

TABLE 1

| Solubility Trial | Example 1 | SR495B | SR9003 | Solubility at 90° C. |
|---|---|---|---|---|
| 1A | 10 | 0 | 90 | did not dissolve |
| 1B | 10 | 5 | 85 | dissolved, hazy solution |
| 1C | 10 | 15 | 75 | hazy solution |
| 1D | 10 | 20 | 70 | clear solution |
| 1E | 10 | 25 | 65 | clear solution |
| 1F | 10 | 30 | 60 | clear solution |
| 1G | 10 | 35 | 55 | clear solution |
| 1H | 10 | 40 | 50 | clear solution |
| 1I | 10 | 45 | 35 | clear solution |
| 1J | 10 | 50 | 40 | clear solution |
| 1K | 10 | 75 | 15 | opaque solution |
| 1L | 10 | 90 | 0 | opaque solution |

Rheology measurements were done for samples where the gellant is completely dissolved and formed a clear solution (Table 2). The theological characteristics of the compositions were obtained by testing with a Rheometrics Fluid Spectrometer RFS3. A temperature sweep from 90° C. to 30° C. at 1 Hz sweep rate was conducted with measurements being taken every 5° C. As demonstrated by these rheology measurements, the jetting viscosity at 80° C. increases with the increasing concentration of SR495 monomer.

TABLE 2

| Solubility Trial | Example 1 | SR495B | SR9003 | G' at 30° C. (Pa) | Maximum viscosity at 30° C. (cPs) | Jetting viscosity at 80° C. (cPs) |
|---|---|---|---|---|---|---|
| 1C | 10 | 15 | 75 | $3.59 \times 10^2$ | $5.74 \times 10^4$ | 4.09 |
| 1D | 10 | 20 | 70 | $4.62 \times 10^2$ | $7.38 \times 10^4$ | 14.71 |
| 1E | 10 | 25 | 65 | $2.075 \times 10^3$ | $3.32 \times 10^5$ | 8.16 |
| 1F | 10 | 30 | 60 | $1.88 \times 10^3$ | $3.02 \times 10^5$ | 8.12 |
| 1G | 10 | 35 | 55 | $1.08 \times 10^3$ | $1.76 \times 10^5$ | 8.66 |
| 1H | 10 | 40 | 50 | $9.85 \times 10^2$ | $1.60 \times 10^5$ | 8.77 |
| 1J | 10 | 50 | 40 | $1.95 \times 10^3$ | $3.12 \times 10^5$ | 11.2 |

As shown in Table 2 and FIG. 1, ink compositions comprising ink vehicles that include epoxy-polyamide gellants and co-monomer mixtures can provide complete gellant solubility and therefore better filtration characteristics.

Examples 2-5

Color Ink Compositions

Examples 2-5 demonstrate color ink compositions formulated using ink vehicles including the epoxy-polyamide gellant of Example 1 and SR9003 and SR495 co-monomers.

The radiation curable ink compositions were prepared as follows, using the component amounts shown in Table 3. The gellant material of Example 1 was first dissolved in propoxylated neopentylglycol diacrylate and caprolactone acrylate to which was added a mixture of photoinitiators, followed lastly by colorant dispersions.

TABLE 3

| Components | Example 2 (% by weight) | Example 3 (% by weight) | Example 4 (% by weight) | Example 5 (% by weight) |
|---|---|---|---|---|
| Example 1 | 8 | 8 | 8 | 7.82 |
| SR9003 (Sartomer) | 29.8 | 30 | 55.13 | 48.82 |
| SR495 (Sartomer) | 15 | 15 | 15 | 14.64 |
| Isopropylthioxanthone (Ciba) | 2 | 2 | 2 | 2.92 |
| Irgacure 819 (Ciba) | 1 | 1 | 1 | 0.96 |
| Irgacure 127 (Ciba) | 3.5 | 3.5 | 3.5 | 3.4 |
| Irgacure 379 (Ciba) | 3 | 3 | 3 | 2.92 |
| Irgastab UV10 (Ciba) | 0.2 | 0.2 | 0.2 | 0.2 |
| Custom magenta dispersion (PR202, SOLSPERSE 34750, in SR9003) | 37.5 | | | |
| Custom black dispersion (NIPEX 150 carbon black (ex Degussa), Efka-7492 in SR9003) Cyan | | 37.5 | | |
| dispersion (PB 15:4, Sun Chemical) | | | 12 | |
| Yellow dispersion (PY 174, Sun Chemical) | | | | 18.3 |

Rheology measurements were done for the ink compositions of Examples 2-5. The rheological characteristics of the compositions were obtained by testing with a Rheometrics Fluid Spectrometer RFS3. A temperature sweep from 90° C. to 30° C. at 1 Hz sweep rate was conducted with measurements being taken every 5° C. These measurements are summarized in Table 4.

TABLE 4

| | G' at 30° C. (Pa) | Maximum viscosity at 30° C. (cPs) | Jetting viscosity at 80° C. (cPs) |
|---|---|---|---|
| Example 2 | $9.09 \times 10^3$ | $1.46 \times 10^6$ | 13.51 |
| Example 3 | $2.43 \times 10^3$ | $3.88 \times 10^5$ | 10.6 |
| Example 4 | $4.60 \times 10^3$ | $7.36 \times 10^5$ | 10.33 |
| Example 5 | $6.67 \times 10^3$ | $1.06 \times 10^6$ | 11.51 |

Example 6

Amide Gellant Preparation

A curable amide gellant was prepared as follows. Into a 250-ml, round-bottomed flask under inert atmosphere, 5.78 g of PRIPOL® 1009 dimer diacid (2 eq. 10 mmoles; Uniqema) was dissolved in 75 mL, dichloromethane. This solution was cooled to 0° C. and 0.24 g of 4-dimethylaminopyridine (DMAP; 0.2 eq, 2 mmoles; Sigma-Aldrich Fine Chemicals) was added. After the DMAP was completely dissolved, 20 mL of a 1 Molar solution of 1,3-dicyclohexylcarbodiimide (DCC) (4 eq, 20 mmoles; obtained from Sigma-Aldrich Fine Chemicals) in dichloromethane was added. After the solution was stirred for 30 minutes, 0.3 g of ethylene diamine (1 eq, 5 mmoles; obtained from Sigma-Aldrich Fine Chemicals) was added, and the mixture was stirred at room temperature. After stirring for 2 hours, 1.72 g of TONE® M100 caprolactone acrylate (1 eq, 5 mmoles; Dow Chemical Co.) and a 20 mL solution including 1.12 g of IRGACURE® 2959 1-(4-(2-hydroxyethoxy)phenyl)-2-hydroxy-2-methylpropan-1-one (1 eq, 5 mmoles, Ciba Specialty Chemicals) in dichloromethane was added and stirred 2 hours at ambient temperature.

The reaction mixture was filtered to remove the byproduct N,N'-dicyclohexylurea (DCHU). The solvents were removed from the filtrate by rotary evaporation. The crude product was washed with acetone, filtered, and dried in vacuum oven to afford a tacky white product with a yield of 5.85 g. The product was believed to be a mixture of the compounds of formulas (23)-(25), which are described above, including compounds of formulas (31)-(33).

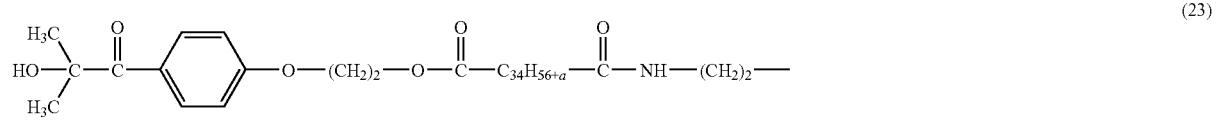
(23)

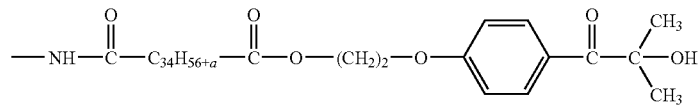

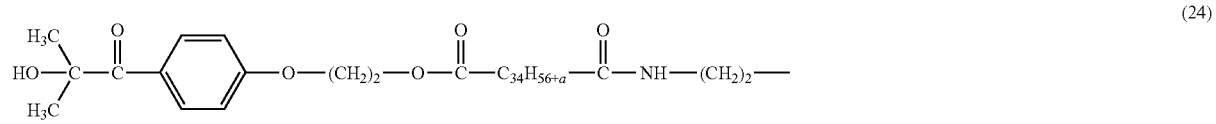
(24)

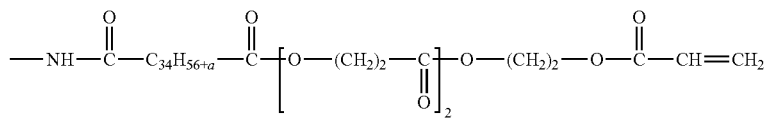
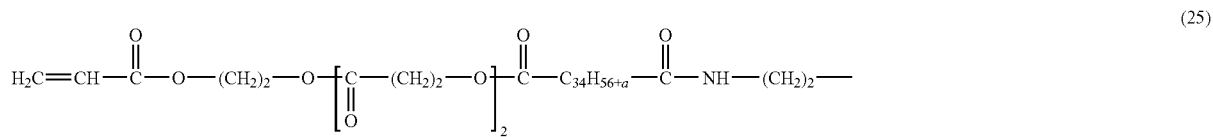
(25)
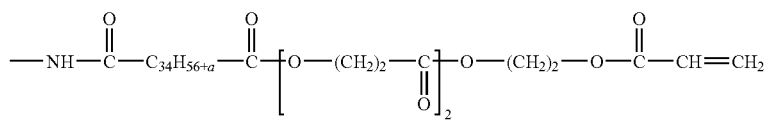
(31)
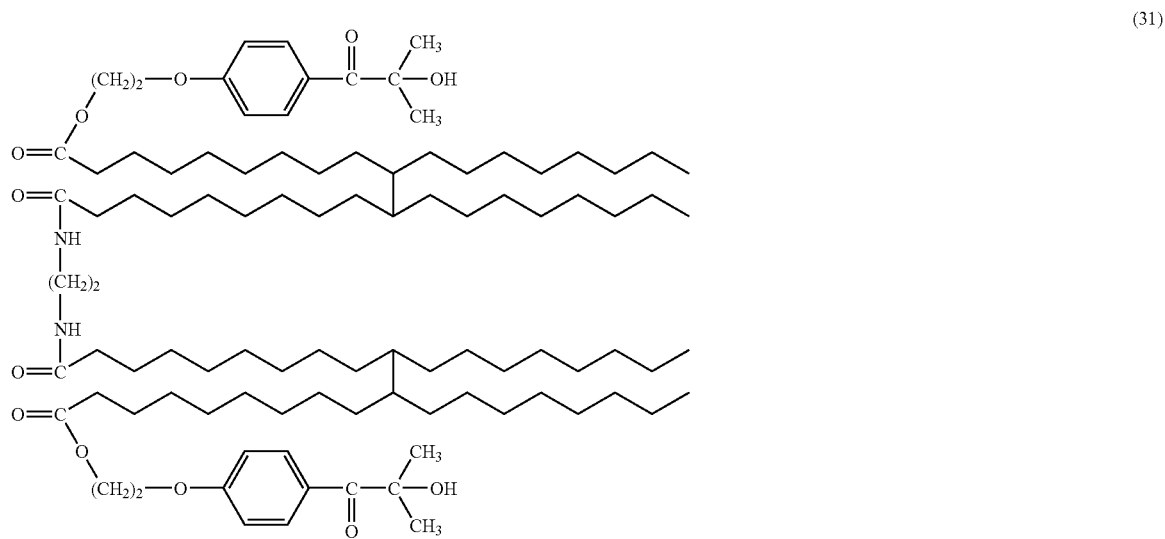
(32)
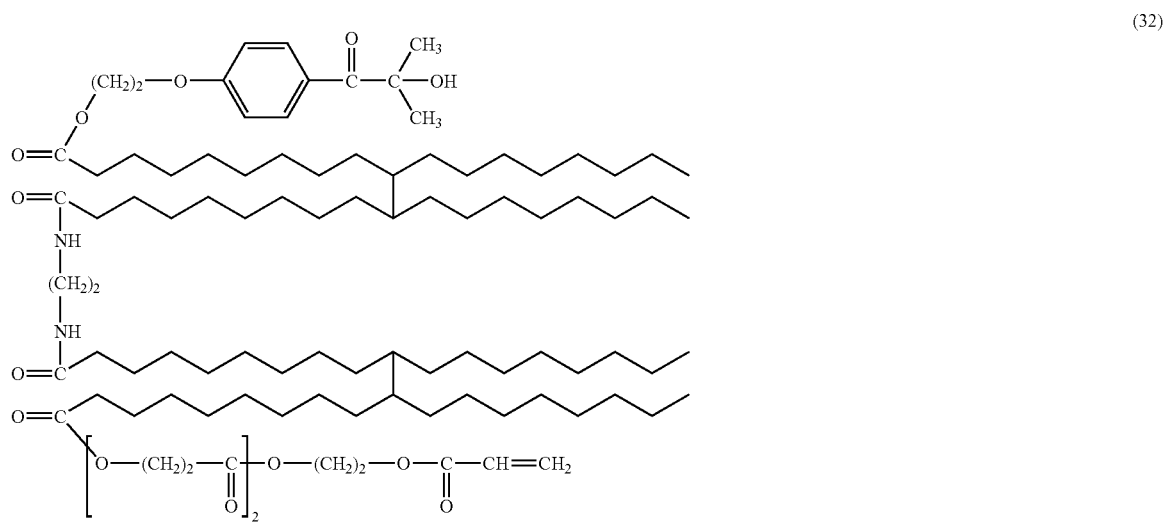

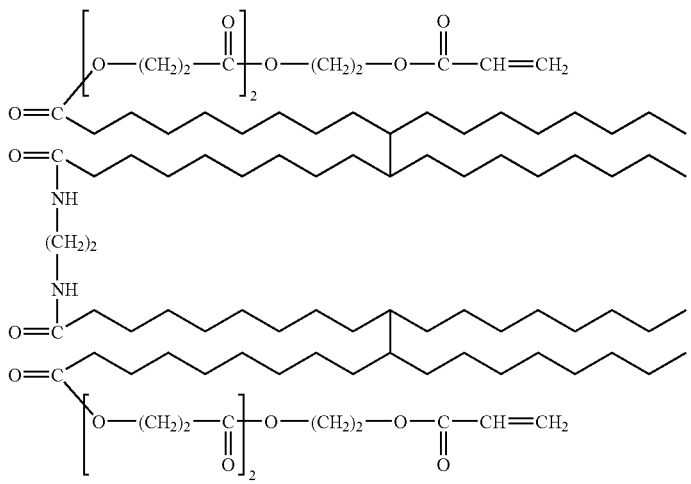

(33)

Examples 7-11

Ink Vehicles Including Mixed Gellants

Examples 7-11 demonstrate ink vehicles including the epoxy-polyamide gellant of Example 1, the amide gellant material of Example 6, SR495B and SR9003.

The ink vehicles of Examples 7-11 were prepared as follows, using the component amounts shown in Table 5. The gellant materials of Examples 1 and 6 was dissolved in propoxylated neopentylglycol diacrylate and caprolactone acrylate. The rheological characteristics of the compositions were obtained by testing with a Rheometrics Fluid Spectrometer RFS3. A temperature sweep from 90° C. to 30° C. at 1 Hz sweep rate was conducted with measurements being taken every 5° C. These rheology measurements are summarized in Table 5.

Example 12-15

Ink Compositions

Examples 12-15 demonstrate color ink compositions formulated using ink vehicles including the epoxy-polyamide gellant of Example 1, the amide gellant material of Example 6 and SR9003 and SR495 co-monomers.

The radiation curable ink compositions were prepared as follows, using the component amounts shown in Table 6. The gellant materials were first dissolved in propoxylated neopentylglycol diacrylate and caprolactone acrylate, to which was added a mixture of photoinitiators, followed lastly by colorant dispersions.

TABLE 5

|  | Example 1 (% by weight) | Example 6 (% by weight) | SR495B (% by weight) | SR9003 (% by weight) | Maximum viscosity at 30° C. (cPs) | Jetting viscosity at 80° C. (cPs) |
| --- | --- | --- | --- | --- | --- | --- |
| Example 7 | 10 |  | 25 | 65 | $3.32 \times 10^5$ | 8.16 |
| Example 8 | 7.5 | 2.5 | 25 | 65 | $9.12 \times 10^5$ | 8.96 |
| Example 9 | 5 | 5 | 25 | 65 | $6.09 \times 10^5$ | 9.24 |
| Example 10 | 2.5 | 7.5 | 25 | 65 | $1.06 \times 10^6$ | 11.69 |
| Example 11 |  | 10 | 25 | 65 | $2.13 \times 10^6$ | 10.7 |

TABLE 6

| Components | Example 12 (% by weight) | Example 13 (% by weight) | Example 14 (% by weight) | Example 15 (% by weight) |
|---|---|---|---|---|
| Example 1 | 8 | 7.5 | 6.5 | |
| Example 2 | | 2.5 | 2.5 | 10 |
| SR9003 (Sartomer) | 30 | 27.8 | 29.1 | 43.3 |
| SR495 (Sartomer) | 15 | 15 | 15 | |
| Isopropylthioxanthone (Ciba) | 2 | 2 | 2 | 2 |
| Irgacure2959 (Ciba) | | | | 3 |
| Irgacure 819 (Ciba) | 1 | 1 | 1 | 4 |
| Irgacure 127 (Ciba) | 3.5 | 3.5 | 3.5 | |
| Irgacure 379 (Ciba) | 3 | 3 | 3 | |
| Irgastab UV10 (Ciba | | 0.2 | 0.2 | 0.2 |
| Custom Carbon Black Colorant A | 37.5 | 37.5 | 37.2 | |
| Custom Carbon Black Colorant B | | | | 37.5 |

The Custom Carbon Black Colorants A and B are dispersions of 80:20 Nipex 150 carbon black:EFKA 7498 dipersant in SR9003.

Figure 2:
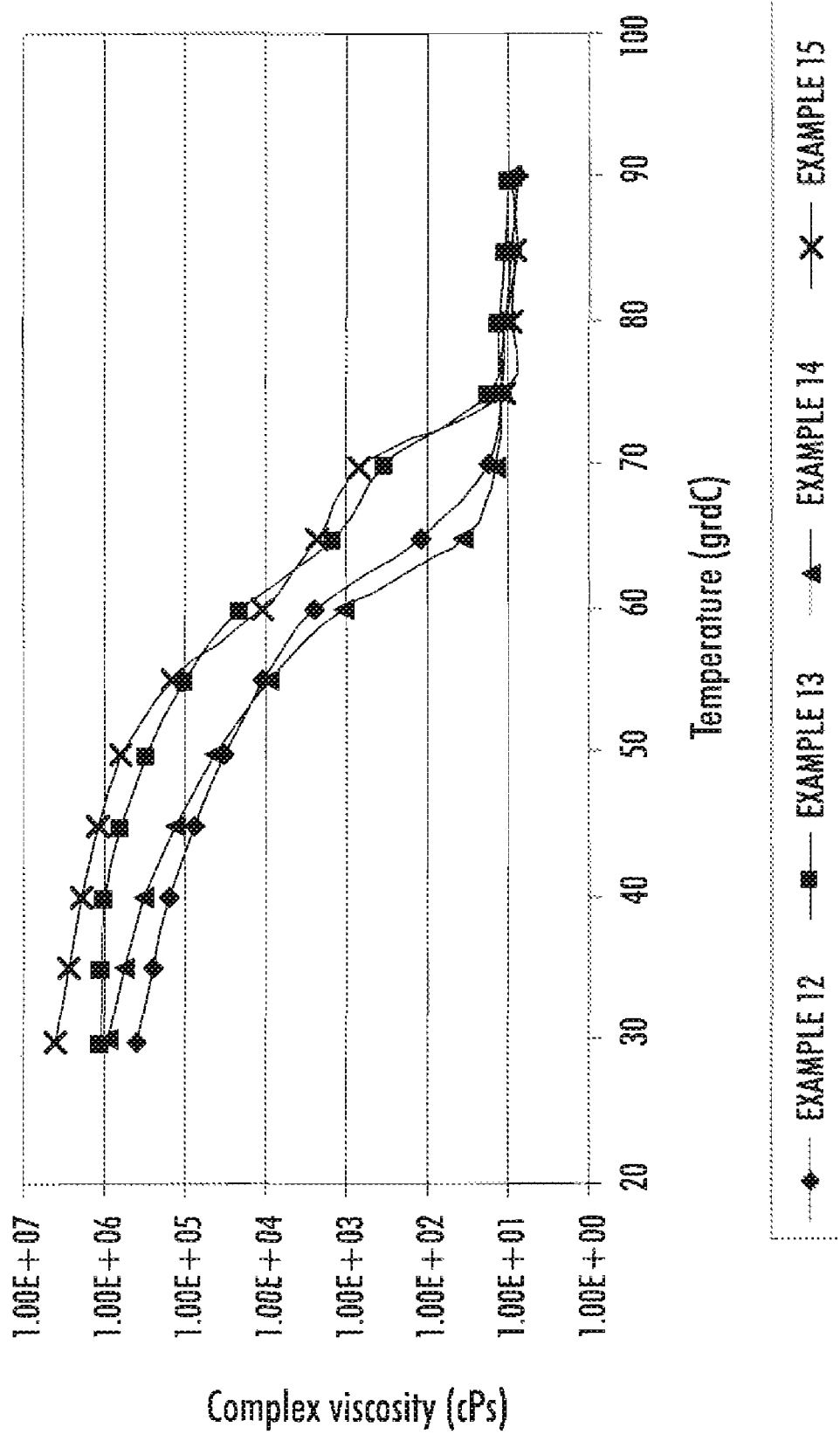

Rheology measurements were done for the ink compositions of Examples 12-15. The rheological characteristics of the compositions were obtained by testing with a Rheometrics Fluid Spectrometer RFS3. A temperature sweep from 90° C. to 30° C. at 1 Hz sweep rate was conducted with measurements being taken every 5° C. These measurements are summarized in Table 7 and FIG. 2.

TABLE 7

| | Example 1 (% by weight) | Example 6 (% by weight) | Maximum viscosity at 30° C. (cPs) | Jetting viscosity at 80° C. (cPs) |
|---|---|---|---|---|
| Example 12 | 8 | — | $3.88 \times 10^5$ | 10.59 |
| Example 13 | 7.5 | 2.5 | $1.13 \times 10^6$ | 12.85 |
| Example 14 | 6.5 | 2.5 | $9.49 \times 10^5$ | 10.62 |
| Example 15 | — | 10 | $3.90 \times 10^6$ | 8.71 |

It will be appreciated that various of the above-discussed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A radiation-curable phase-change ink vehicle having improved gellant solubility, the ink vehicle comprising:
   at least a first co-monomer,
   at least a second co-monomer that is different from the first co-monomer,
   at least a first gellant comprising a curable epoxy-polyamide composite gellant, and
   at least a second gellant that is different from the a first gellant,
   wherein the first co-monomer and the second co-monomer are radiation-curable monomers,
   wherein the first co-monomer is present in an amount ranging from about 40 to about 70% by weight, relative to the total weight of the ink vehicle, and the second co-monomer is present in an amount ranging from about 20 to about 50% by weight, relative to the total weight of the ink vehicle, and
   wherein the first co-monomer is propoxylated neopentyl glycol diacrylate and the second co-monomer is caprolactone diacrylate or 2-phenoxyethyl acrylate.

2. The radiation-curable phase-change ink vehicle according to claim 1, wherein the curable epoxy-polyamide composite gellant is derived from an epoxy-group containing component comprising at least one of polyphenol-based epoxy resins, polyol-based epoxy resins or fatty acid epoxides, and a polyamide component.

3. The radiation-curable phase-change ink vehicle according to claim 2, wherein the curable epoxy-polyamide composite gellant is present in an amount of from about 1 to about 50% by weight of the ink vehicle.

4. The radiation-curable phase-change ink vehicle according to claim 1, wherein a ratio of the first co-monomer to the second co-monomer is between about 75 parts to about 15 parts and about 55 parts to about 35 parts.

5. The radiation-curable phase-change ink vehicle according to claim 4, wherein the ratio of the first co-monomer to the second co-monomer is about 65 parts to about 25 parts.

6. The radiation-curable phase-change ink vehicle according to claim 1, wherein the second gellant is an amide gellant.

7. A radiation-curable ink composition comprising a colorant and the ink vehicle according to claim 1.

8. The radiation-curable ink composition according to claim 7, further comprising at least one initiator chosen from the group consisting of a photoinitiator, a thermal initiator, and mixtures thereof.

9. The radiation-curable ink composition according to claim 7, further comprising a nonreactive reactivity control agent.

10. The radiation-curable ink composition according to claim 7, wherein the composition is an ink jet ink.

11. The radiation-curable ink composition according to claim 7, wherein the composition has a gel transition temperature of from about 25° C. to about 100° C.

12. The radiation-curable ink composition according to claim 7, wherein the composition forms a gel state having a viscosity of at least $10^3$ mPa·s.

13. The radiation-curable ink composition according to claim 7, wherein the composition has a storage modulus of at least about $10^2$ Pa in the temperature range of 30° C. to 50° C.

14. The radiation-curable ink composition according to claim 7, wherein the composition has a viscosity of less than about 50 mPa·s at temperatures between about 40° C and 110° C.

15. A radiation curable ink composition comprising the radiation-curable phase-change ink vehicle according to claim 8, wherein the ink composition has a viscosity of less than about 50 mPa·s at temperatures between about 40° C. and 110° C.

16. The radiation-curable phase-change ink vehicle according to claim 1, wherein a total amount of the first gellant and the second gellant is about 15 weight percent or less, relative to a total weight of the ink vehicle.

17. The radiation-curable phase-change ink vehicle according to claim 1, wherein the second gellant is present in an amount ranging from about 0.25 to about 75% by weight, relative to a total weight of the gellant materials.

18. The radiation-curable phase-change ink vehicle according to claim 17, wherein the second gellant is present in an amount ranging from about 25 to about 50% by weight, relative to a total weight of the gellant materials.

19. The radiation-curable phase-change ink vehicle according to claim 17, wherein the second gellant is present in an amount of about 25% by weight, relative to a total weight of the gellant materials.

20. The radiation-curable phase-change ink according to claim 6, wherein the amide gellant has a formula of Formula 1,

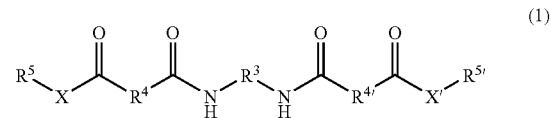

wherein $R^3$ is selected from the group consisting of an alkylene having 1 to about 20 carbon atoms, an arylene having about 5 to about 20 carbon atoms, an arylalkylene having about 6 to about 32 carbon atoms, an alkylarylene having about 6 to about 32 carbon atoms, and combinations thereof, wherein $R^4$ and $R^{4'}$ are selected from the group consisting of an alkylene having 1 to about 54 carbon atoms, an arylene having about 5 to about 14 carbon atoms, an arylalkylene having about 6 to about 32 carbon atoms, an alkylarylene having about 6 to about 32 carbon atoms, and combinations thereof, wherein $R^5$ and $R^{5'}$ are selected the group consisting of a photoinitiator, an alkyl having about 2 to 100 carbon atoms, an aryl having about 5 to about 100 carbon atoms, an arylalkyl having about 6 to about 100 carbon atoms, an alkylaryl having about 6 to about 100 carbon atoms, and combinations thereof, and wherein X and X' are an oxygen atom or a group of the formula —$NR^6$—, wherein $R^6$ is selected from the group consisting of a hydrogen atom, an alkyl having 1 to about 100 carbon atoms, an aryl having about 5 to about 100 carbon atoms, an arylalkyl having about 6 to about 100 carbon atoms, an alkylaryl having about 6 to about 100 carbon atoms, and combinations thereof.

* * * * *